(12) United States Patent
Dumm

(10) Patent No.: US 7,401,546 B2
(45) Date of Patent: Jul. 22, 2008

(54) BATCH PASTEURIZER

(75) Inventor: Richard H. Dumm, Windsor, CO (US)

(73) Assignee: Dairy Tech, Inc., Windsor, CO (US)

( * ) Notice: Subject to any disclaimer, the term of this patent is extended or adjusted under 35 U.S.C. 154(b) by 852 days.

(21) Appl. No.: 10/923,331

(22) Filed: Aug. 20, 2004

(65) Prior Publication Data
US 2005/0103213 A1    May 19, 2005

Related U.S. Application Data

(60) Provisional application No. 60/501,756, filed on Sep. 9, 2003.

(51) Int. Cl.
*A47J 27/00* (2006.01)
*A23G 9/00* (2006.01)

(52) U.S. Cl. .............. 99/470; 99/453; 99/455; 99/483; 366/149

(58) Field of Classification Search ........... 99/453, 99/483, 452, 455, 470; 422/26, 307; 261/108, 261/112, 115, 116, 117, 118; 366/149, 144
See application file for complete search history.

(56) References Cited

U.S. PATENT DOCUMENTS

| 612,106 | A | * | 10/1898 | Hill .............................. 165/90 |
| 2,082,460 | A | | 6/1937 | Omsted |
| 2,317,480 | A | * | 4/1943 | Peters ........................ 165/299 |
| 2,569,958 | A | * | 10/1951 | Struve et al. ............. 220/573.4 |
| 2,576,050 | A | * | 11/1951 | Soden ...................... 165/109.1 |
| 2,607,566 | A | * | 8/1952 | Saunders ..................... 99/348 |
| 3,780,644 | A | | 12/1973 | Canfield |
| 3,973,048 | A | | 8/1976 | Sollerud |
| 4,310,476 | A | | 1/1982 | Nahra |
| 4,432,276 | A | | 2/1984 | Catelli |
| 4,446,778 | A | | 5/1984 | Cipelletti |
| 4,446,781 | A | | 5/1984 | Schmitt |
| 4,479,423 | A | | 10/1984 | Schwitters et al. |
| 4,515,823 | A | | 5/1985 | Kirschenmann |
| 4,534,986 | A | | 8/1985 | Hasting |
| 4,738,302 | A | | 4/1988 | Abma |
| 4,739,699 | A | | 4/1988 | Nelson |
| 5,080,164 | A | | 1/1992 | Hermans |
| 5,209,157 | A | | 5/1993 | Rodriguez |

(Continued)

OTHER PUBLICATIONS

S.M. Godden, et al.,Effect of On-Farm Commerical Batch Pasteurization of Colostrum and Serum Immunoglobulin Concentration in Dairy Calves; J. Dairy Sci. 86:1503-1512 @ American Dairy Science Association, 2003, date unknown.

*Primary Examiner*—Reginald L Alexander
(74) *Attorney, Agent, or Firm*—James K. Poole, Esq.

(57) ABSTRACT

Batch pasteurizers are disclosed for processing milk, colostrum and other dairy products. The pasteurizers comprise inner drums to contain the processed liquid, an outer drum surrounding same and providing an annular space for retaining a heating fluid (heated by an electrical heater), a helical coil to carry cooling fluid through the heating fluid, a motorized pump or impeller to agitate the treated liquid to optimize heat transfer, and a control system to switch the heater on and off, actuate cooling liquid flow and optionally, at least partially drain the heating fluid to provide a temperature/time profile and close temperature tolerance, all of which produce pasteurized products with adequate levels of immunoglobulins to provide newborn animals with sufficient immune function.

4 Claims, 13 Drawing Sheets

U.S. PATENT DOCUMENTS

| | | |
|---|---|---|
| 5,280,748 A | 1/1994 | Pardo |
| 5,327,818 A * | 7/1994 | Olivetti ................. 99/455 |
| 5,360,055 A | 11/1994 | Hup |
| 5,424,087 A | 6/1995 | Kuo |
| 5,443,857 A | 8/1995 | Arph |
| 5,727,450 A * | 3/1998 | Vassiliou ................. 99/353 |
| 6,189,440 B1 | 2/2001 | Amundson |

* cited by examiner

BATCH PASTEURIZER

REFERENCE TO RELATED APPLICATION

This application is related to Applicant's U.S. Pat. No. 6,276,264 for PORTABLE BATCH PASTEURIZER issued Aug. 21, 2001 (although not claiming priority therefrom), which patent is incorporated herein by reference in its entirety. This application claims priority from Applicant's provisional application U.S. Ser. No. 60/501,756, filed Sep. 9,2003 including Appendix A thereto (Godden et al., "Effect of On-Farm Commercial Batch Pasteurization of Colostrum on Colostrum and Serum Immunoglobulin Concentration in Dairy Calves," *J. Dairy Science* Vol. 86, pp. 1503-1512, 2003), which is also incorporated herein by reference in its entirety.

BACKGROUND OF THE INVENTION

1. Field of the Invention

The present invention relates to apparatus for pasteurizing or heat treating fluid products for consumption by animals or humans.

2. Description of the Relevant Art

Since the dawn of history, various methods and apparatus have been devised for the heat treatment of foodstuffs for human and animal consumption, including cooking, pasteurization and sterilization. Both pasteurization and sterilization have been used with milk and related products. U.S. Pat. No. 4,310,476 provides in columns 1 to 5 an extensive discussion of pasteurization and sterilization of milk, which is incorporated herein by reference. Column 30 of the same patent identifies legal U.S. standards for milk pasteurization, which are also incorporated by reference.

Dairy farmers and other producers of foodstuffs such as milk are often required to transport their produce to central plants for processing including pasteurization or sterilization and packaging. In less advanced countries, modern processing plants may be unavailable or inaccessible, so that dairy products must be utilized locally, with whatever processing is available. Excess milk and related products may be used on the farm for feeding calves or other livestock, but may spoil or transmit disease if not pasteurized. There is an apparent need for economical apparatus for pasteurizing such milk or related products on site to permit safe use for feeding calves and the like. There is also a need for simple and economical apparatus for processing milk at or near the source in less advanced countries for both human and animal consumption.

Numerous patents disclose methods and apparatus for sterilizing or pasteurizing food directly or enclosed in containers. A number of these patents are disclosed in the background section of Applicant's U.S. Pat. No. 6,276,264. Additional patents relevant to the present invention are discussed below.

U.S. Pat. No. 4,788,871 discloses a probe for monitoring temperature and pressure in a thin-walled plastic container (i.e., a food container) which is undergoing a pasteurizing or sterilizing operation in suitable apparatus. The apparatus includes a pressurized vessel connected to water circulation and temperature control means.

U.S. Pat. No. 5,519,189 discloses the use of an external pump, heater and control apparatus for heating a drum (and contents to be heated) by circulating heated water (or other liquid) through a bath in a tub surrounding the drum.

U.S. Pat. No. 6,437,295 discloses a "lotion heating system" including an open container holding a closed bottle of lotion in a bath of water, the container, bath and lotion bottle being heated by an electrical heater with multiple levels of heating power.

U.S. Pat. No. 5,773,795 discloses an electric warming device using a "P.C." Heating element and a water bath. Thermostatic temperature control is discussed.

U.S. Pat. No. 4,479,423 discloses a "Continuous-Flow Apparatus For Pasteurizing Batches of Product," including heating and cooling coils in heat-exchange contact with a conduit for milk or other products to be pasteurized. The apparatus includes a cleaning system.

U.S. Pat. No. 5,671,662 discloses a pasteurizer for food products including a tank having an agitator to agitate the liquid therein, the agitator being set into a recess at the bottom of the tank and powered by an external motor.

U.S. Pat. No. 5,977,521 discloses an electric heater for a chafer, normally including a chafing dish, wherein the heater is positioned against the bottom of the chafing dish by a spring.

U.S. Pat. No. 6,189,440 discusses a continuous flow pasteurizer comprising a first tank and a second tank interconnected by a pasteurization conduit. Fluids are heated to a desired temperature in a first section of the conduit and held at this temperature while flowing through a second section of the conduit.

Most of these patents disclose apparatus and methods for the continuous processing of milk or other foodstuffs, and most of these systems are complicated and expensive. There remains a need for simple, economical apparatus for batch processing of various types of milk and components thereof on dairy farms and the like.

While it has long been known that pasteurization is an important tool in preventing the spread of disease through milk and other food products, pasteurization of colostrum has been a more delicate matter. Colostrum is known as the "first milk" of most mammals. It is extremely high in nutritional content, but more importantly, it carries the first "vaccine" for the newborn in the form of various immunoglobulins (Ig). These proteins confer immunity to the newborn by being absorbed directly into their bloodstream. Adequate levels of these immunoglobulins (Ig) must be consumed by the newborn at a very early age, usually within hours of birth. Due to the high level of protein in the form of Ig, the pasteurization procedure must be carried out in a manner which preserves these proteins while still adequately pasteurizing. There has been some success in this field over the past couple of decades, but a commercial unit has not been widely available to do quantities large enough for the average dairy.

The drawbacks of current systems include the following: Many pasteurizers are high temperature short time (HTST) systems that rapidly bring the product to a high temperature, hold it there for a short time and then rapidly cool the product once again. These systems cause rapid degradation of the Ig, often lowering the level below that required to impart immunity to the newborn. Also at these high temperatures, the end product is greatly thickened in consistency. This thickening prevents delivery of the colostrum to the newborn animal. For these reasons, these HTST systems will not handle the product well and often become plugged to the point of requiring disassembly for cleaning them. Other manufacturers have designed thermos systems in hot water baths and small table top models that will pasteurize the colostrum by bringing it to a lower temperature and holding it there for a longer period of time. While this methodology does a much better job of preserving the Ig, there are still considerable drawbacks. These systems are typically labor intensive due to the lack of automation. The operator must keep the product stirred for even heating. The temperature control is often primitive and involves hand held thermometers or loosely calibrated thermostats such as those used on an electric skillet. The other main disadvantage is the small volume that most of these will handle. Two gallons seems to be the capacity of some of the larger units. The average cow will yield more than this in her first milking, which makes the unit once again labor intensive for most cow (bovine) or goat (caprine) dairies. There is a particular need for a pasteurizer which can optimize the use of this scarce resource.

SUMMARY OF THE INVENTION

It is an object of the present invention to provide apparatus for the batch pasteurizing or heat treatment of products in various locations, especially food products for liquid consumption by animals or humans. Another object of the invention is to provide such apparatus which can be used with typical hot and cold tap water and electrical current available in dairy barns and the like. Another object is to provide for convenient field pasteurization of excess dairy products, which can then be fed to calves or other young livestock with reduced chances for the spread of disease. Still another object of the invention is to provide apparatus that can be quickly and effectively cleaned between uses to minimize health hazards. Yet another object of the invention is to provide apparatus of various sizes to meet the needs of diverse dairy sites. A further object is to fabricate such apparatus from various commercially available components to provide units having varied sizes and capabilities. Still another object is to provide programmable time-temperature profiles to accommodate various processing needs. A further object is to provide a system which will allow a suitable heating/cooling cycle time for pasteurizing typical volumes of milk. Another object is to simplify the design and assembly of the apparatus so that the average dairyman can operate and service the unit with minimum downtime. Yet another object is to provide apparatus capable of a fully automated cycle, including the option of delayed starts of the process. A key object is to provide apparatus and methods for the effective pasteurization of colostrum in bulk quantities obtained in dairies, removing most pathogens without reducing the contents of immunoglobulin (Ig) to unacceptable levels.

Certain of these and other objects and advantages may be attained by various apparatus and method embodiments of the present invention, comprising apparatus for the batch heating and cooling of fluids, comprising:

a first cylindrical container for treating said fluids, comprising connections near the top and bottom thereof adapted for the circulation and withdrawal of said fluids;

a second cylindrical container at least partially surrounding the circumference and height of said first container to form an annular chamber therebetween, with the enclosed portion of said first container serving as a heat transfer surface;

connections to the annular chamber for at least one source of heating and cooling fluids;

means for filling said annular chamber with said heating/cooling fluid and flushing same with cooling fluid;

heating means within said annular chamber to heat the heating fluid therein and thus the fluid under treatment;

means for circulating said fluid under treatment to provide even heating without scorching same;

temperature sensing means for separately measuring the temperatures of the fluid under treatment and the heating/cooling fluid;

on-off control means for activating the heating means to heat the heating fluid, and thus the fluid under treatment, to a preset temperature and hold the fluid under treatment at this preset temperature for a predetermined time period; and thermostat and control means for activating at least one valve to provide a flow of cooling fluid in the annular chamber when the treated fluid has been at the preset temperature for a sufficient time to flush the heated fluid therefrom and cool the fluid under treatment, and for turning off or confining the cooling fluid to the annular chamber to terminate a cycle when the treated fluid has attained the desired cooled temperature.

Heating and cooling means can be provided to adjust the temperature of separate heating and cooling fluids prior to their entry to the annular chamber, with valve means and switching means for successively turning on and off the heating and cooling fluids. Preferably, the means for circulating the fluid under treatment comprise at least one pump connected to direct the fluid from the bottom of the cylindrical container to the top through the connections in the container and external tubing or hose means for transferring the treated liquid from the inner cylinder can employ the same pump.

Preferably, the fluid under treatment is directed into the top of the container at a tangent or an acute angle to the side thereof to create a whirlpool pattern of circulation. The stream of fluid can be directed slightly downward into the container to minimize splashing above the container edge. The objective is to maximize circulation while minimizing splashing and/or frothing. Additional circulation means for the fluid under treatment can comprise rotating impellers driven by suitable motors or the like, as disclosed in U.S. Pat. No. 6,276,264. In a preferred embodiment, the inner cylinder is mounted with a bottom surface above the bottom of the outer cylinder, providing a space connected with the annular chamber for heating/cooling fluid to circulate through to enhance heat transfer to the fluid under treatment via the bottom surface. The heating and cooling fluids used can either be returned to their sources for reuse or directed to drains.

The heating means can include at least one immersible electrical heating element within the annular chamber, extending over a substantial portion of the circumference of the chamber, to heat the heating fluid in the chamber and thus the fluid to be treated in the inner cylinder. When the bottoms of the cylinders are separated to provide additional circulation space and heat transfer area, heating elements can also be emplaced therein.

Preferably, the control system, circulation means and heating means are configured to maintain a preset temperature such as a pasteurization temperature within a specified range effective to pasteurize milk and milk products comprising colostrum without scorching and with minimal degradation of the proteins therein. The first container can be open at the top, provided with a removable lid, or sealed at the top, with connections for filling the container with fluid to be treated.

Further in accordance with the invention, methods are provided for carrying out heat treatment processes such as pasteurization of dairy products using the apparatus of the invention, comprising steps of:

supplying the first container with fluid to be treated;
filling the annular chamber with heating/cooling fluid;
activating the heating means to heat the heating/cooling fluid and thus the fluid under treatment to a preset temperature;
activating the circulation means to circulate the fluid to be treated from the bottom of the first container to the top to create a mixing effect;
controlling the heating means to maintain the heating/cooling fluid and the fluid under treatment at a predetermined treatment temperature for a predetermined time;

shutting off the heating means and promptly directing cooling fluid through the annular chamber to quickly reduce the temperature of the treated fluid to a preset, stable lower temperature for use or storage;

shutting off or confining the cooling fluid to complete the cycle; and removing the treated fluid from the container.

By "quickly" it is meant that the rate of cooling is quantitatively greater than the rate of heating, expediting the transition to use or storage temperatures to minimize the possibility of bacterial growth from any contamination and to minimize any additional damage to IgG or other protein molecules that could occur if the treated liquid is not rapidly cooled.

For the pasteurization of dairy products such as colostrum, the time/temperature profile and batch size should preferably be coordinated and controlled so as to produce a pasteurized product which retains a substantial, predetermined proportion of the natural immunogens such as immunoglobulins which benefit infant livestock such as calves when fed as a feed supplement, while destroying pathogenic organisms.

The apparatus can be employed wherever suitable sources of electrical power and heating/cooling fluids are available. Such apparatus can be used in various dairy barns or other facilities at a single site.

The system of the present invention is configured to be capable of pasteurizing colostrum at lower temperatures for long periods of time. Larger volumes can be pasteurized than with previously available systems, and the temperature control can be calibrated to exacting standards. By assembling commercially available controller components, calibrating and adjusting them properly to control the heating means, those skilled in the art can provide apparatus in accordance with the present invention which can achieve the required standards. There are preferably built in alarms to indicate failure to reach temperature or failure to complete the cycle. The unit can also be connected to a temperature recording device for additional monitoring, preferably integrated into the control system.

A simpler embodiment of the invention also comprises inner and outer cylinders, preferably with a cylindrical base under the outer cylinder to support the entire unit above the floor. The inner cylinder is configured to be filled with a liquid to be treated (e.g., milk or colostrum) and is fitted with a lid to enclose the top after filling. The top can also serve as a mount for an electric motor or other driving means which has shaft means penetrating the lid and driving an impeller within the inner cylinder to agitate the liquid therein during treatment. Temperature sensing means such as thermocouples also penetrate the lid to measure the current temperature of the treated liquid and transmit this information to a control system. While thermocouples are presently preferred, thermistors, RTDs (resistance temperature detectors), infrared devices or glass bulb thermometers or other suitable devices could be used. The inner cylinder is configured to fit snugly inside the outer cylinder to provide a seal to exclude air, while allowing an annular space between the two cylinders and further space between their bases therein, so as to allow a heating/cooling fluid to circulate within the combined spaces. Both cylinders have handle means, which can be secured together with appropriate securing means to hold the cylinders firmly together during operation. The lid for the inner cylinder is also preferably fitted with handles for ease of handling. At least one electrical heating element penetrates the wall of the outer cylinder to heat the heating/cooling fluid between the bases of the cylinders, and mechanical support means are preferably provided to support the inner cylinder in its proper position above the electrical heating element(s). A cooling coil of heat-conductive material is formed in a helical manner to pass from its entry point near the top of the outer cylinder through the annular space between the cylinders to the bottom of the outer cylinder, where it exits. The helix is formed to allow the inner cylinder to fit easily inside the coil and the outer cylinder, and is used to circulate cooling liquid within the coil through the heating fluid between the cylinders when signaled by the control system to cool the treated liquid. The cooling water is circulated from the bottom of the cylinders to the top before exiting for recycling or drainage. In addition to switching the heating element(s) on and off to increase, maintain and decrease the temperature of the heating fluid, the control system also provides for draining the heating fluid from between the cylinders, replacing it with cooling water for quicker cooling of the treated fluid.

BRIEF DESCRIPTION OF THE DRAWINGS

A more complete appreciation of the invention and many of the objects and advantages thereof will be readily obtained by perusing the following detailed description and appended claims in combination with the accompanying drawings, wherein:

DETAILED DESCRIPTION OF PREFERRED EMBODIMENTS

Although a preferred embodiment of the present invention has been designed for pasteurizing milk on dairy farms and the like, and the invention will be discussed in that context, systems within the scope of the invention can be used for processing or heat treating all sorts of fluid materials. The fluids will normally be liquids of low to moderate viscosity such as milk, but can also be more viscous dairy products such as colostrum, dairy beverages, ice cream mix or cheeses. Naturally, the characteristics of the material to be treated must be studied and understood before effective heat treatment can begin. For example, it is necessary for each product to determine the appropriate temperature-time relationships for optimum treatment.

It is well known that the pasteurization or sterilization of milk and milk products involves a delicate balance between providing enough heat (through specified combinations of time and temperature) to kill target microbes without adverse effects on the flavor and other characteristics of the product.

Different products, and even milk from various species such as goats, will require different temperature-time profiles for optimum treatment. Generally, the best results with milk products are obtained by brief heating at relatively high temperatures, followed by prompt and fast cooling. With certain products such as colostrum, the temperature may need to be limited to avoid degradation of the protein ingredients (i.e., Ig) which impart immunity to calves or other juvenile livestock which ingest the material. The apparatus of the present invention can be adjusted and programmed to provide heat treatments, including cooking, pasteurization or sterilization treatments, for a variety of milks and milk products (e.g., cream, colostrum, reconstituted milk, ice cream mixes, puddings, candies and condensed or evaporated milk), fruit juices, ciders, fermented beverages such as beer and wine, yeast and meat extracts, slurried materials such as soups and stews, vegetable oils and chemical preparations. Thus, while preferred embodiments will be disclosed for the pasteurization of cow's milk and related products, the broad capabilities of the apparatus and methods disclosed should be kept in mind.

Figure 1:
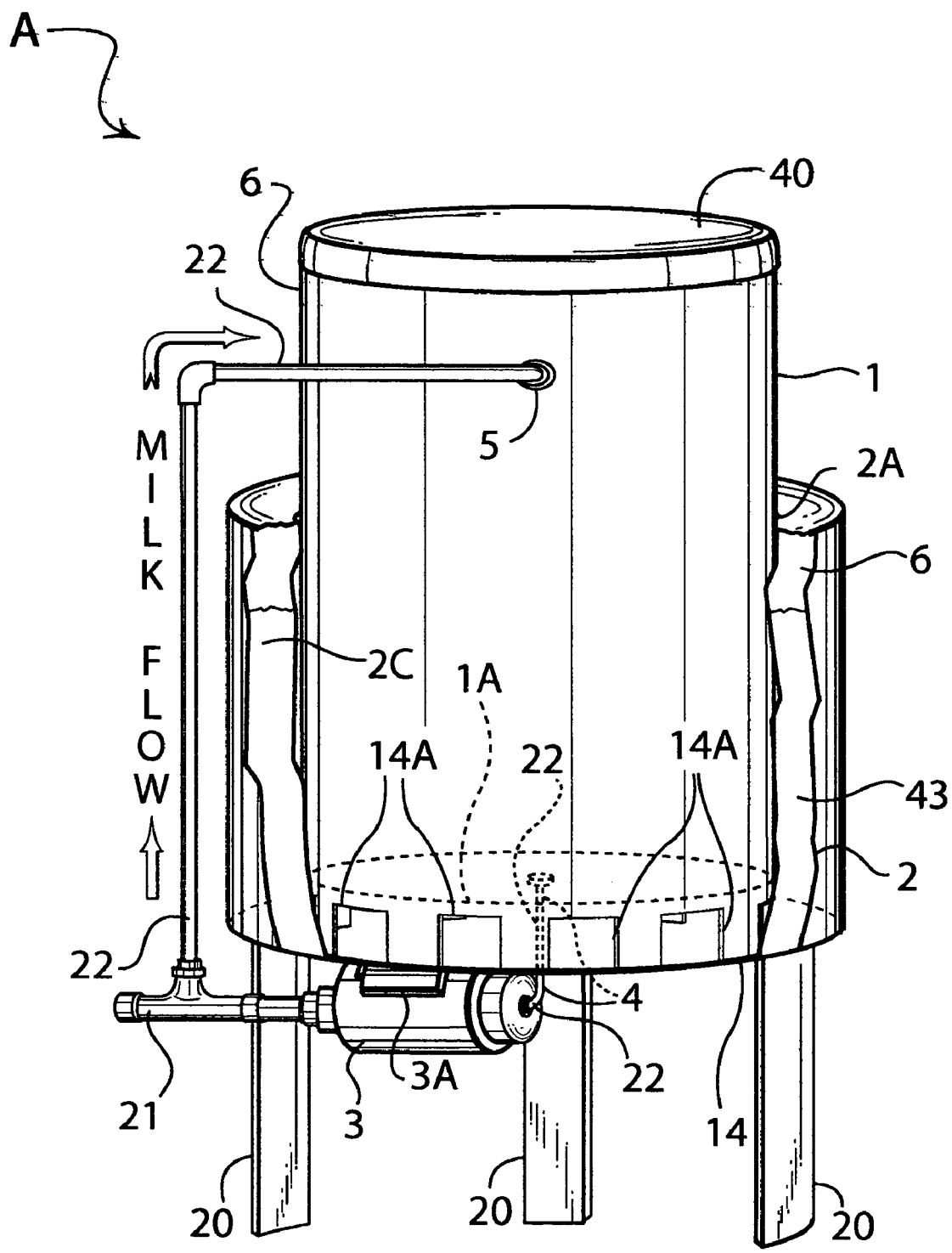
FIG. 1 is a front perspective view of the apparatus of the invention with a portion cut away.
Figure 2:
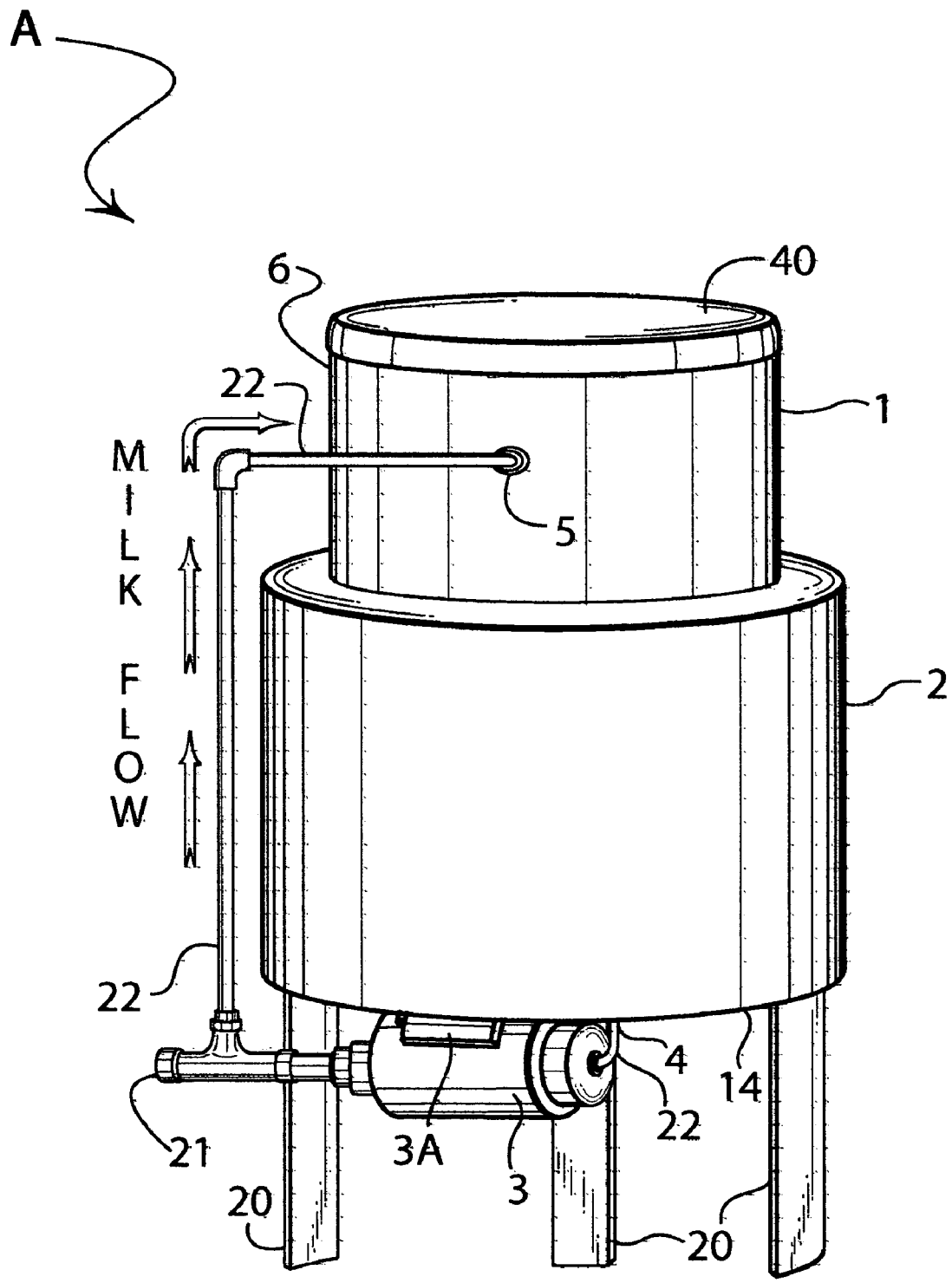
FIG. 2 is a similar perspective view of an the embodiment of FIG. 1.

Product Description:

As shown in FIGS. 1, 2 et al., the pasteurizing unit A itself includes an inner cylindrical vessel (1) capable of housing the fluid to be pasteurized. This vessel is currently constructed of stainless steel in an effort to promote cleanliness; however, it could also be constructed of a variety of other metals, alloys or polymeric composite materials that are capable of withstanding the heat, heat transfer, pressure and cleanliness requirements of the system. Such containers can be any standard product designed for dairy farm use, but are preferably made of stainless steel or durable plastics such as fiberglass, polypropylene, polyethylene, nylon or polytetrafluoroethylene (Teflon™), which are light and can be cleaned effectively. The containers preferably include a spigot or other liquid transfer means near the bottom to facilitate transfer of the treated liquid into buckets or other secondary containers. Pump (3) can be connected to accomplish such transfers. This inner vessel (1) can be designed to accommodate a variety of volumes by increasing its height and/or diameter. The vessel is then surrounded by a secondary cylinder (2). This secondary outer vessel is generally sealed at top (2A) and bottom to the inner vessel (1), thus providing an annular space or chamber (2C) between them for housing the heating and cooling liquid (43). This outer cylinder can be covering any portion or all of the inner cylinder (in circumference and height) to increase the volume contained between the two vessels and the heat transfer surface area. The base of the two cylinders (14) is preferably a common base shared between the two. There can be a secondary base (1A) fitted in the inner cylinder (1), as shown in FIG. 1, which is positioned above the bottom (14) of the outer and inner cylinders to allow the heating/cooling fluid (43) to have access to the bottom of the inner cylinder for improved heat transfer through increased surface area. Circulation ports 14A are cut into the inner cylinder wall below false bottom 1A to facilitate this circulation, and can have any suitable size, shape and number to achieve an optimal balanced flow of heating/cooling fluid between the sides and bottom of the inner cylinder. FIG. 2 illustrates the simpler version, with the bases of cylinders (1) and (2) coplanar.

The inner cylinder (1) containing the liquid to be pasteurized (41) can be fitted atop with any suitable material for a lid (40), but can also be a closed vessel with an access port for filling. Whatever the means, this cover will help to keep temperatures more evenly controlled during the pasteurization process. Although gravity alone produces a good seal, optionally a gasket of suitable elastomeric or resilient material (not shown) can be used between the lid (40) and container (1). The inner cylinder has two ports in the design illustrated. The pump outlet (5) is situated toward the top of the vessel (1). At the bottom of the inner cylinder (1) is another port defined as the pump inlet (4). Tubing (22) of suitable diameter and materials can then utilize the inlet port (4) to draw the fluid being treated out of the bottom of the inner cylinder by means of a pump (3) and send it up to the outlet port (5) where it can be returned to the cylinder (1). This action allows the fluid to be pasteurized to be thoroughly mixed during the process, producing more even heating without scorching or otherwise damaging components of the fluid.

Figure 3:
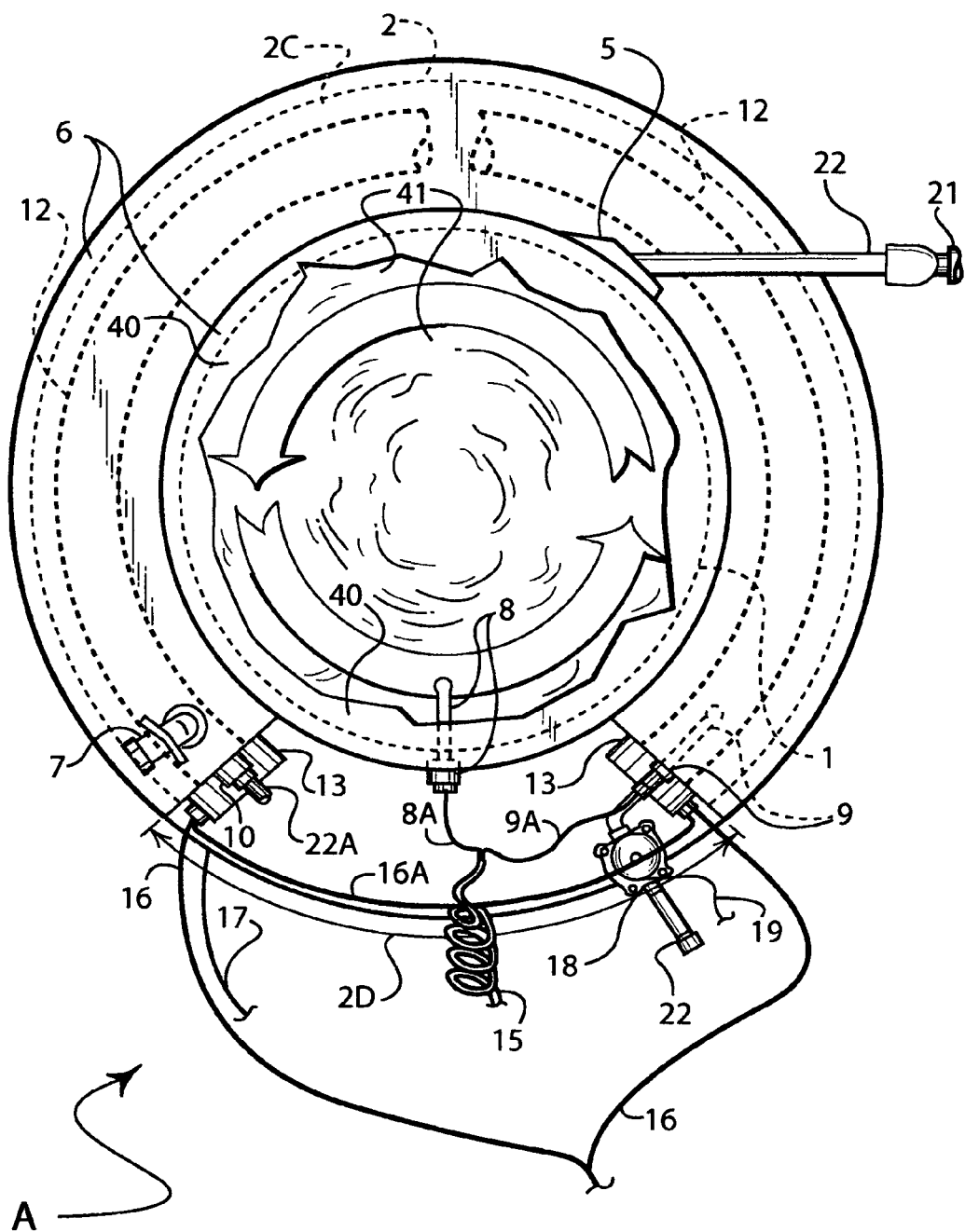
FIG. 3 is a top view of the apparatus in operation, with a portion of the top cut away.

The diameter of the tubing (22) can be selected or adjusted by suitable valve means (not shown here) to control flow rates. The angle of the tube (22) returning fluid to the inner cylinder can also be adjusted vertically or horizontally to optimize the mixing of the fluid and thus the heating or cooling. Currently, the fluid is returned on a tangent or at an acute angle to the cylinder wall, aimed slightly downward so that it creates a whirlpool effect (as shown in FIG. 3), and decreases splashing of the fluid being pasteurized. The pump inlet (4) can be located at a variety of positions within the bottom of the inner cylinder (1) to allow for improved mixing or improved ability to empty the contents of the cylinder once the process is complete. Alternatively, the pasteurized fluid can be thoroughly mixed by other means such as a motor/propeller combination, e.g. as disclosed in Applicant's U.S. Pat. No. 6,276,264. The tubing (22) can also be fitted with a three-way ball valve (21) (FIGS. 1, 2, & 4) or other suitable valve means configured to allow the pasteurized fluid to be easily drained and/or pumped from the inner cylinder.

The entire pasteurization unit A is supported by legs (20) or other suitable support means of creating a stand so that the pump (3) can be housed underneath the unit by suitable brackets (3A) or the like and the unit base is not exposed to liquid spills. By having the unit elevated, the operator can also clean around the unit more thoroughly. Alternatively, the unit could be mounted directly on the floor with the pumping mechanism on the side of the unit. The pump can be any suitable type capable of maintaining a steady flow of liquid from the pump inlet, such as standard circulation pumps. Such pumps are commercially available from TACO Industries and other sources. The pump motor should be an industrial grade electrical motor which is suitable for damp environments, and preferably is sealed from the atmosphere.

Figure 4:
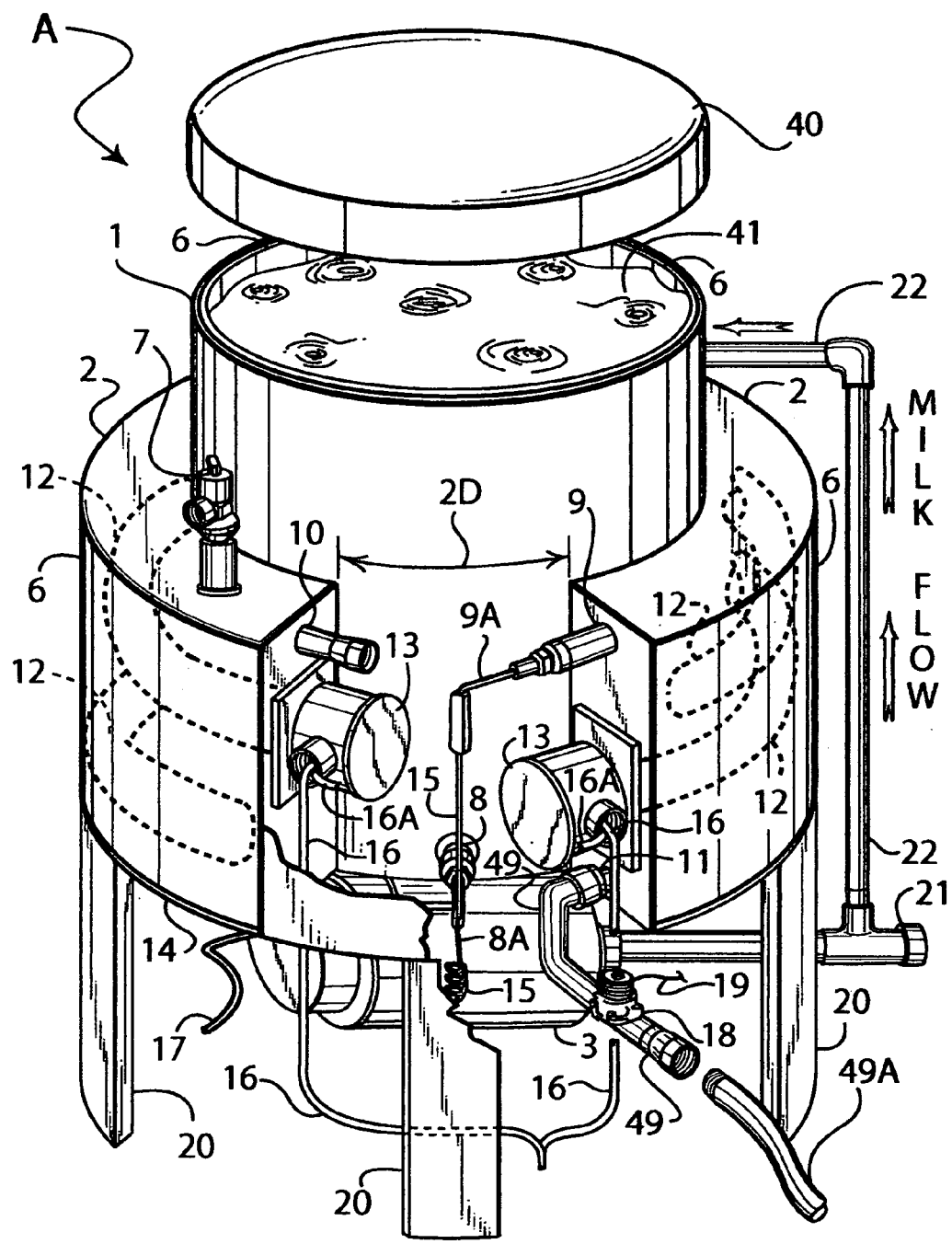
FIG. 4 is a rear perspective view of the apparatus.
Figure 5:
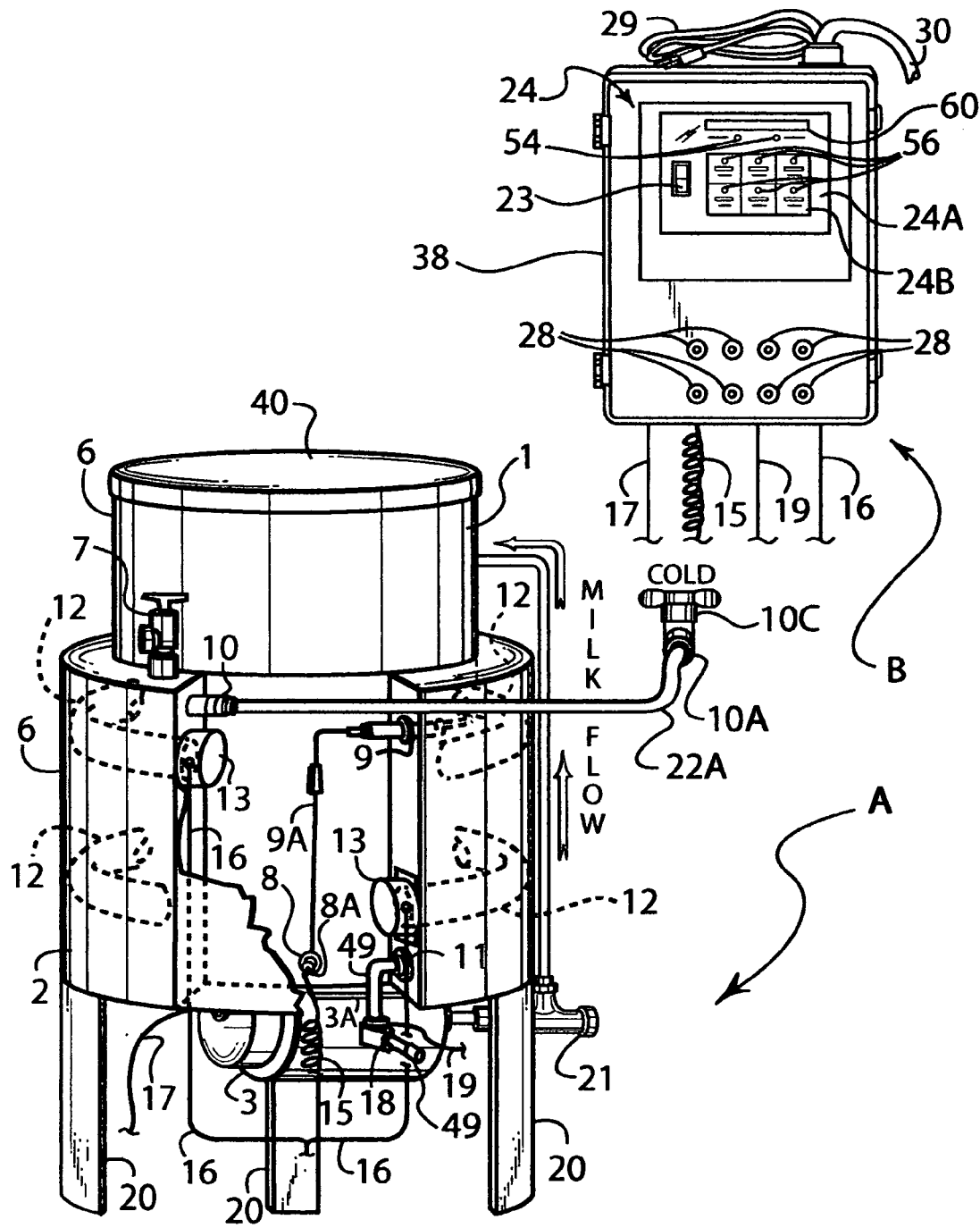
FIG. 5 is a rear perspective view of the apparatus, including a front view of the controller.

The outer cylinder (2) can also be constructed of a variety of materials, but is currently made of stainless steel. The annulus (2C) that this creates around the inner cylinder (1) does not currently extend the full diameter of the inner cylinder (1), as shown in FIGS. 3, 4 and 5. The gap (2D) that is left in the design is provided to house several of the electrical components that operate the system. However, the unit could just as easily be designed with the outer cylinder (2) and annulus (2C) completely surrounding the diameter of the inner cylinder. Within the gap (2D) as presently designed, several components are housed. The pressure relief valve (7) is placed in the top lip of the outer cylinder (2). This valve is provided for safety reasons should fluid pressures between the two vessels exceed safe operation. This valve could be replaced with any variety of pressure relief devices such as pressure discs that are commercially available, or even a simple overflow tube. The placement of the valve could also be adjusted depending on the requirements of the chosen device. The overall system could optionally be designed with open ports and fluid level controlling devices such as float valves to produce an "open" system without pressure concerns.

As shown in FIGS. 3 and 4, the heating elements (12) enter into the vessel where the gap (2D) is designed in the outer cylinder construction. These consist of commercially available 220V AC immersible heating elements that meet the requirements of the present system, presently 4.5 kwatts each. These elements are housed and mechanically attached in such a way as to allow for easy mechanical removal and replacement if necessary. The terminals of these heating elements are covered by suitable watertight covers (13) that allow for proper wiring and replacement if necessary. The heating elements (12) are wired to each other by jumper (16A) and then provided power supply from the controller (24) via 220V AC power supply lines (16), as shown in FIGS. 3 and 5. Any suitable type, number and arrangement of heating elements can be employed. For example, the elements could take the form of immersible heating coils to provide increased surface area, and materials which may be easily shaped to conform to the curvature of annulus (2C). Alternatively, the heat could also be provided by other means such as steam tubes, gas fired burners, etc., as disclosed herein, and it could enter the unit from a variety of directions to afford design changes to improve heat distribution and transfer. Heating means should be provided which provide sufficient heat to bring the heating fluid and treated fluid to their set temperatures quickly, and can also be controlled via on-off control to maintain the set temperature of the treated fluid within acceptable tolerance.

Figure 9:
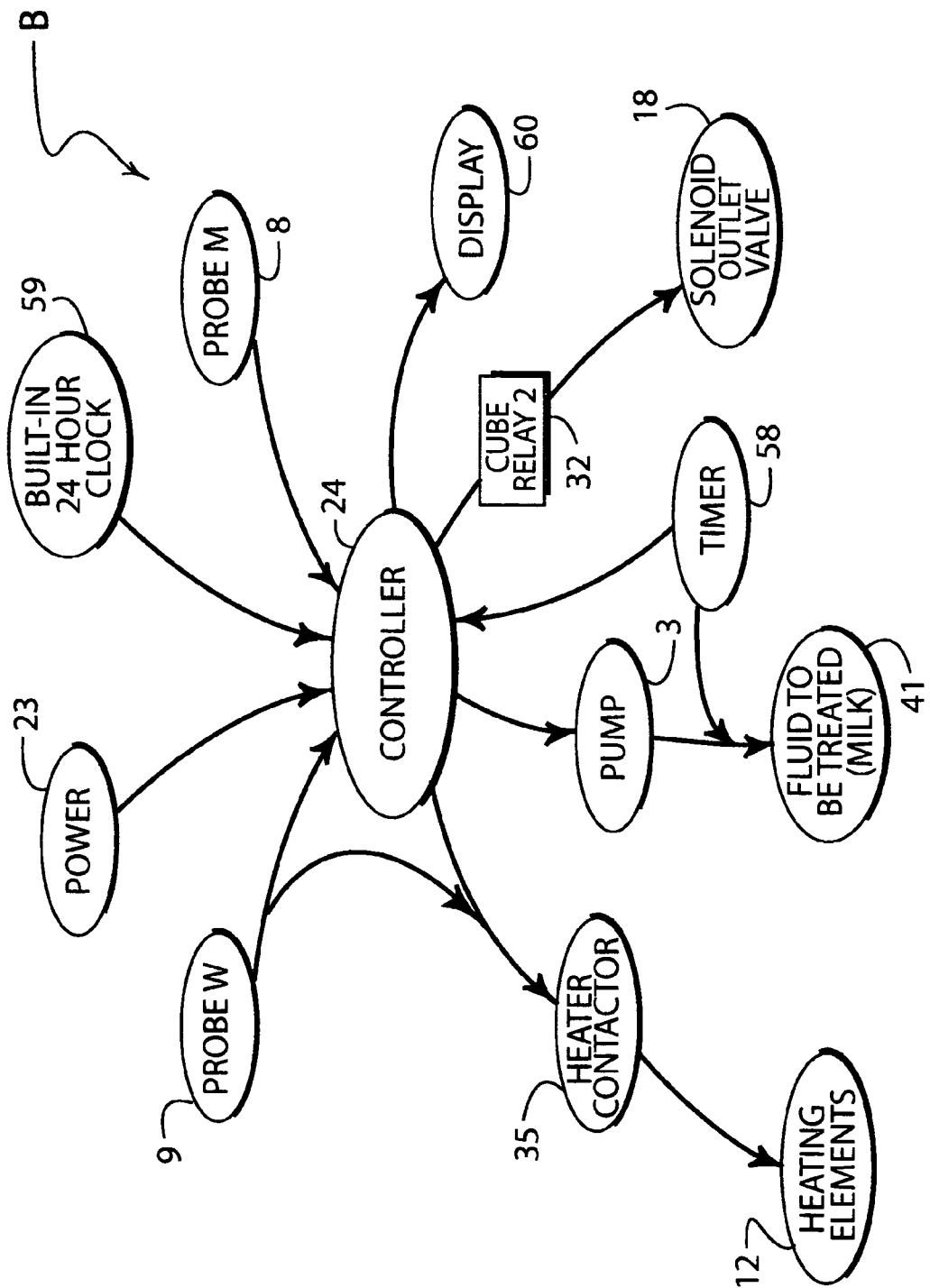
FIG. 9 is a schematic diagram of the control system.

Hot water can be provided to the heating annulus to start the cycle, which can be conventional hot tap water. For faster results, an inline heater can be used to heat the water initially entering the annulus. Such a heater should be adequate to produce water at pasteurizing or sterilizing temperatures from sources such as ordinary hot water heaters which may be used in dairy barns. Such hot water heaters normally produce water in the 175 to 200 deg. F range. If such hot running water is not available, additional or more powerful inline heaters can be used. An electrical in-line heater can be provided within the hot water circuit to bring the heating water to the proper predetermined temperature for the cycle. The heater can be actuated when water flow begins. FIG. 9 of U.S. Pat. No. 6,276,264 provides a detailed view of a typical inline heater, which is commercially available from Infinity Fluids. As shown there, leads 73 provide power to heating element 74, in response to signals from leads 75. Other suitable heaters are available commercially from Electro-Pak, Inc. of Reading, PA. Various types of commercially available gas-powered inline heaters can also be used. Alternatively, if a source of steam is available, steam may be injected into the hot water intake system to heat the water, as disclosed in U.S. Pat. No. 3,780,644, which is incorporated herein by reference.

Circulation of the heating fluid (43) within the annular chamber (2C) can be provided to improve heat transfer and thus reduce heating time while providing more even heating of the treated fluid by any suitable means. A separate circulating pump and tubing can be provided to move the heating fluid from one point of the annular chamber to another, as disclosed above for circulation of the treated fluid, or at least one power-driven propeller can be used within the annular chamber, also as disclosed above. Although adequate circulation within the annular chamber will normally be achieved by the flow of cooling water through the system, such circulation means as are installed can also be used during the cooling phase.

The treated fluid thermocouple M (8) is also housed in this area (gap 2D) so that it can penetrate the inner cylinder (1) and monitor the temperature of the fluid to be pasteurized. This can be placed in any suitable area of the inner cylinder to allow for accurate monitoring of the temperature. Multiple thermocouples can be employed. The thermocouple preferably reaches to approximately the lower third of the fluid in the container when the unit is assembled, and senses the temperature of the circulating fluid when the system is operating. The position(s) of the thermocouple(s) permit operating with a partially full container of product. The thermocouple (8) is attached to the controller (24) by thermocouple wires (8A) and retractable cord (15) to carry the input signal. The heater fluid thermocouple W(9) is also placed in the gap area to monitor the fluid temperature within the annular volume (2C) between the inner (1) and outer cylinders (2). This can be placed in any suitable area of the outer cylinder to allow for accurate monitoring of the temperature, and multiple thermocouples can be used if desired. The thermocouple (9) is also connected to the controller (24) by thermocouple wires (9A) and retractable cord (15) to carry the input signal. Optionally, temperature-recording devices (either integral to the controller or external) can use the output of thermocouple M (9) to provide a history of the treated fluid temperature for quality control.

Water inlet (10) is located on one side of the gap created in the outer cylinder, near the top of annulus 2C. This allows water (10B) to be supplied to the heat exchange section of the unit to maintain pressure and prevent damage to the heating apparatus, as well as serving as a coolant later during the process. Although shown in FIG. 5 with only a cold water supply (10A) entering inlet (10), sources of hot and cold water can be provided as disclosed in Applicant's U.S. Pat. No. 6,276,264. With suitable valving actuated by the control system, hot water can be used initially to expedite the heating process, with cold water used at the end of the heating cycle to flush the heated water and cool the contents of inner cylinder (1). For example, a faster transition between heating and cooling phases can be made if separate connections are used for heating and cooling fluids, with cooling fluid turned on as heating fluid is shut off. The water outlet (11) is provided to allow the heating fluid to escape the system for cooling means via tubing (49) when the heating cycles are complete. This water outlet is controlled by a solenoid valve (18) or other remotely controlled valve means so that the controller (24) can determine when to allow water to escape the system. This valve is actuated by a 110V AC supply line (19) from the controller (24).

The unit is insulated to improve efficiency as well as to protect the operator from contact with extreme temperatures. This insulation comes in a variety of suitable forms such as sprayed on foam, or wrapped covers that afford insulative properties, as with household water heaters. Outer cylinder (2) has insulation (6) covering all exposed surfaces, optionally including the bottom of base (14), while inner cylinder (1) has insulation (6) covering the portion above outer cylinder (2).

Figure 6:
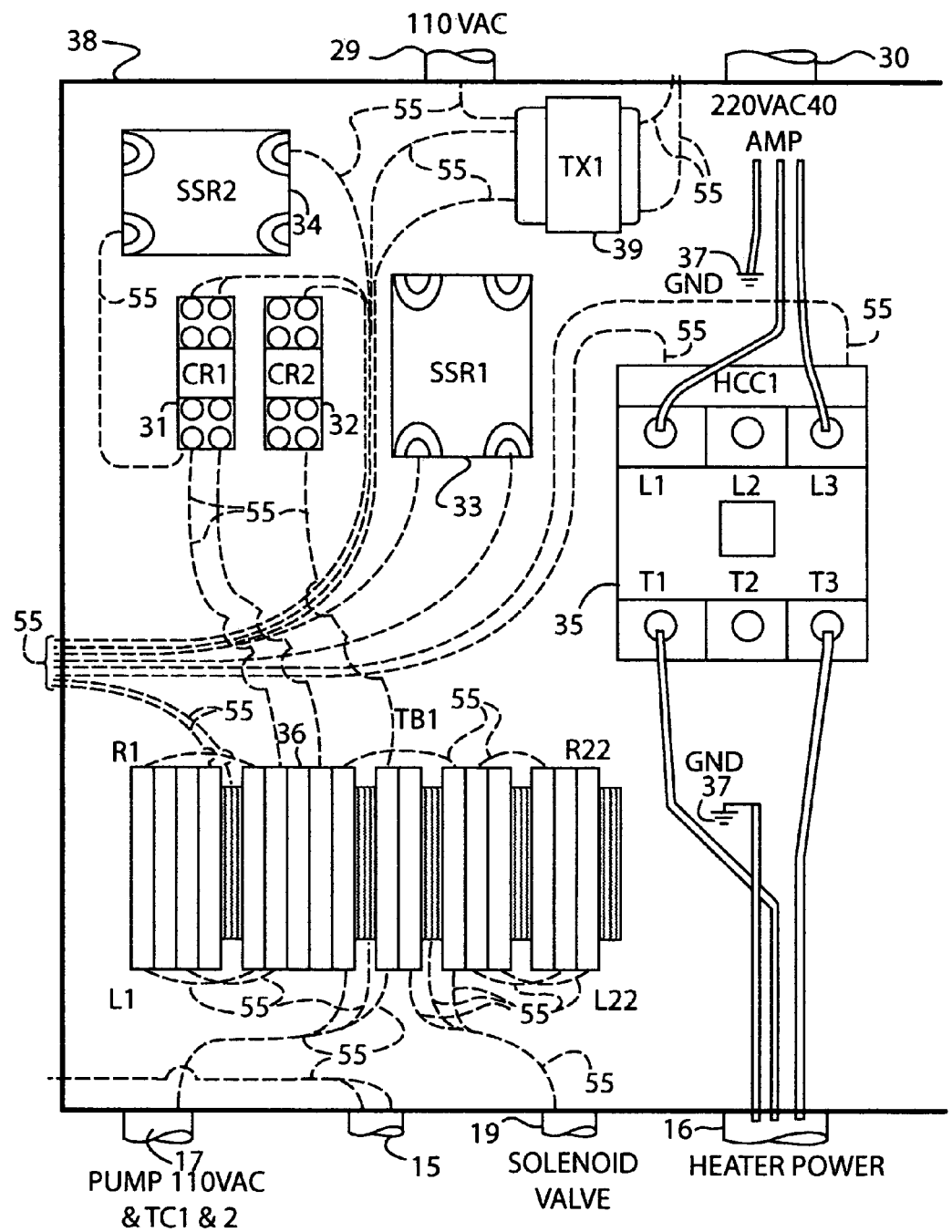
FIG. 6 is a right side view of the controller interior.
Figure 7:
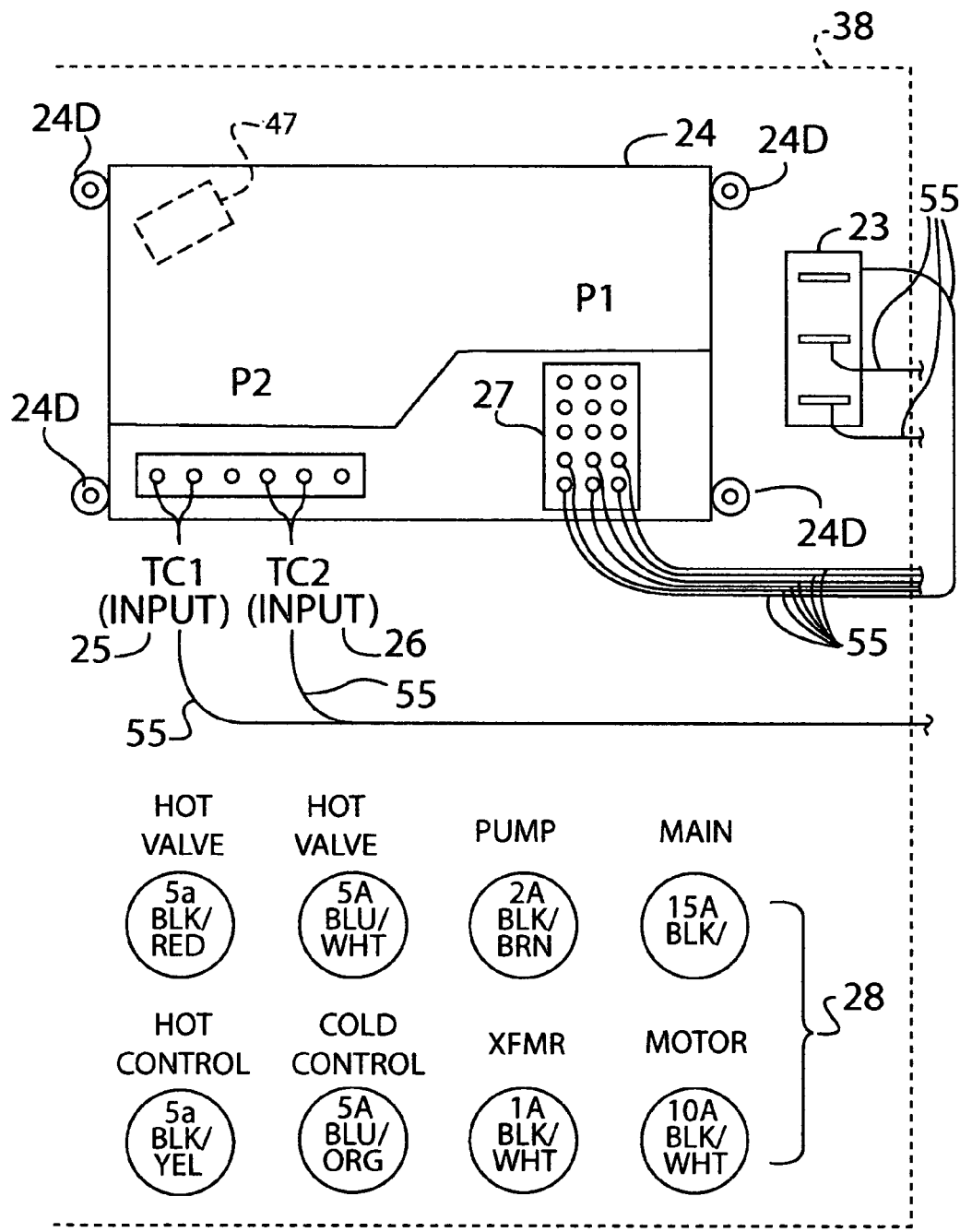
FIG. 7 is a left side view of the controller interior, illustrating circuit breakers adjacent to the control panel.
Figure 8:
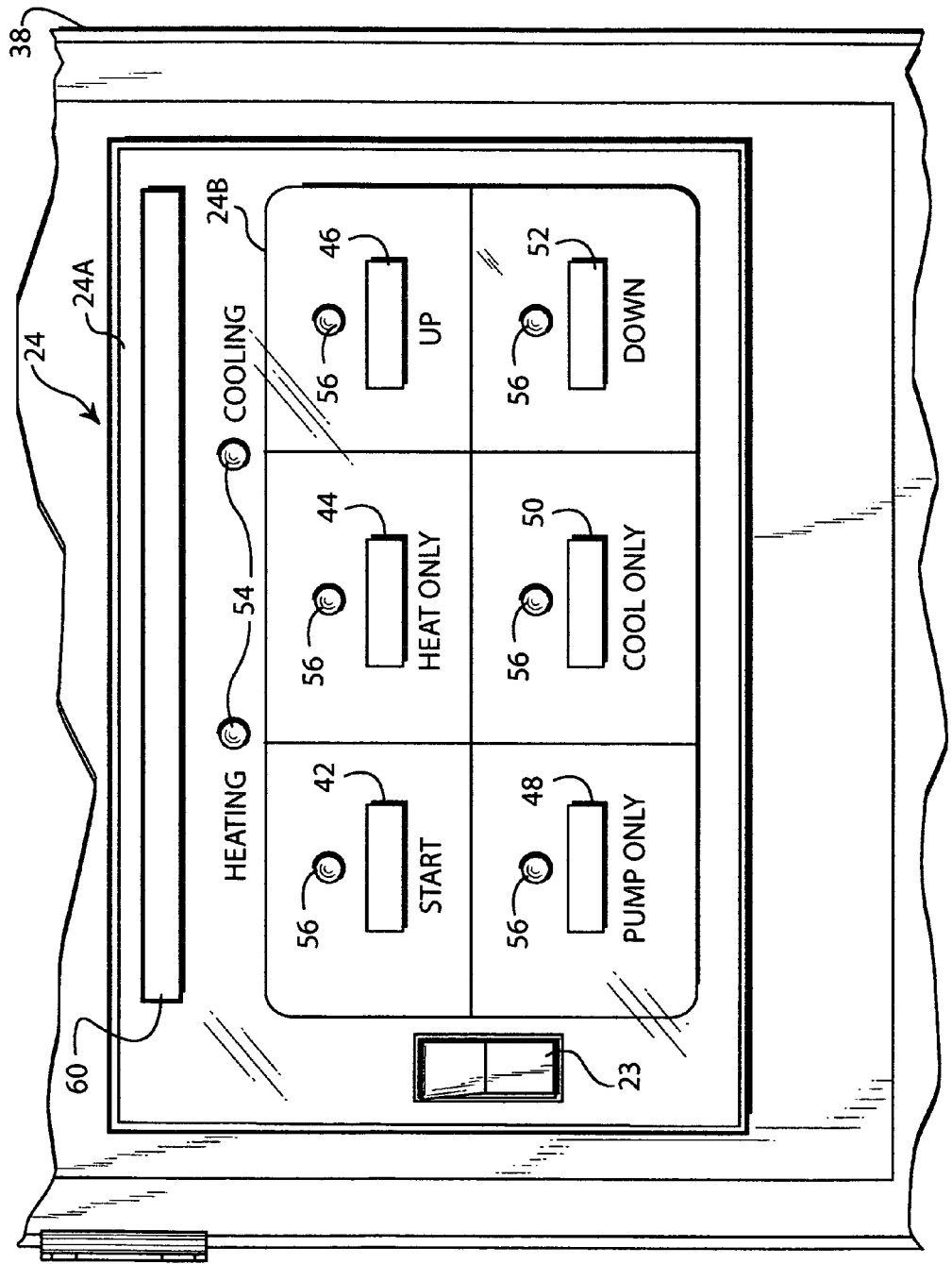
FIG. 8 is a front view of the control panel of the controller.

Control System Description:

The control system 24, illustrated in FIGS. 6, 7 and 8, centers around a programmable logic computer or other control system with the ability to accept temperature inputs and maintain timing capabilities that coincide with appropriate outputs. It must be emphasized that a variety of control systems assembled from commercially available controllers, switches, valves and the like can be used for this purpose. The controller illustrated is digital microprocessor-based, but analog controllers can also be used. All the components illustrated are electrically interconnected (with wiring 55, as partially shown in FIGS. 6 and 7) to function with the control system described below and in FIG. 9. In the most basic version, the apparatus can be manually controlled, provided that a thermometer or other appropriate temperature sensor is available. Circuit breakers (28) are provided for the various circuits, as shown in FIG. 7.

Preferably, the controller comprises a programmable logic controller (PLC), which would allow many other desirable programming options including data logging and interfacing with personal computers. Suitable controllers should have thermocouple inputs as described above, plus at least two event-driven contacts which can be set or programmed to energize or deenergize based upon current temperature conditions. Suitable controller components are commercially available from the Barber-Colman Co. of Loves Park, Ill., Honeywell, Watlow Controls of Winona, Minn. and other sources. As illustrated, controller (24) is secured within NEMA enclosure (38) by bolts, sheet metal screws or other fasteners (24D).

This particular controller operates in the following manner: Power (29) (110VAC) is supplied to the transformer (39), producing reduced AC voltage(s), and controller (24), which allows the controller to operate with AC and DC outputs (with the aid of suitable inverters or the like). During the heating phase of the cycle, the controller (24) receives temperature input M (25) for the fluid being pasteurized. Until it reaches the desired temperature, cube relay 1 (31), solid state relay 1 (33) and solid state relay 2 (34) are signaled to stay open, which in turn sends 110 VAC power (17) to the pump (3) and the heater contactor (35). 220 VAC power (30) is supplied to the heater(s) through the contactor (35), and then on to the heating elements (12) via cords (16), which includes ground (37). The heater is also controlled secondarily by thermocouple input W (26), which monitors the heater fluid temperature from thermocouple W (9). When a set or maximum heating liquid temperature is detected by the controller, the power output to the heater is closed. Normally the maximum temperature will be below 212 deg. F., but if higher temperatures are required for sterilizing fluids, the annular chamber can be pressurized.

A tertiary level of control exists between the cube relay 1 (31) and the solid state relay 2 (34). When the pasteurized fluid temperature reaches desired endpoints, the controller signals the cube relay to close, which then in turn shuts off power to the solid state relay. With the relay closed, the heater does not function, providing a form of "on-off" control. At desired temperatures, the controller can also be programmed with time intervals of heating to hold the fluid at the set temperature.

Heating continues until the temperature in the circulating fluid under treatment reaches the predetermined temperature (e.g., 161 deg. F for bovine milk to be pasteurized) and a timer (58) unit in the controller (24) is started to maintain the temperature for a predetermined time (e.g., 30 minutes for normal milk pasteurization at 145 deg. F, or 15 seconds at 161 F.). At this point, heating elements 12 shut off, being activated again only as necessary to maintain the treated fluid temperature within preset limits. Upon reaching the end of the time out, the controller then signals cube relay 2 (32) to open, which allows solenoid valve (18) to open after being powered (19). This permits the flow of cold water through the system to cool the pasteurized product to a predetermined temperature for use or storage. The flow of cold water is maintained until the temperature of the circulating fluid is reduced to the proper level for immediate use (i.e., about 100 deg. F) or storage (about 38 deg. F).

Naturally, the colder the water the faster the treated liquid can be cooled and the longer the product will last without spoiling. Normal cold tap water is sufficient at moderate ambient temperatures, but for faster cooling and/or chilling to storage temperatures, chilling or refrigeration systems can be used in the cold water intake system, represented by cooler (77) in FIG. 3 of U.S. Pat. No. 6,276,264. Such systems can be as simple as a chamber containing ice over which the intake water flows, or can incorporate conventional inline refrigeration systems such as used to produce chilled drinking water. U.S. Pat. No. 3,780,644 discloses such systems in columns 4 and 7, which are incorporated herein by reference. Once the liquid is cooled to the desired temperature, the pasteurized milk (or other heat-treated fluid) can be pumped out as described for use such as feeding calves.

During this phase, cube relay 1 (31) and solid state relay 2 (34) are closed. Solid state relay 1 (33) is open, which allows the pump (3) to continue circulating the fluid (41) for rapid cooling. At the end of the cycle, the controller (24) can actuate an alarm, such as audible alarm (47) within controller (24) to alert the operator. It is also equipped with the ability to detect and display errors from the input devices, and sound an alarm if the cycle is not completed within a programmable length of time. Controller (24) is programmed to signal the pump (3) at the end of a timed cycle so that it can be utilized to empty the pasteurized contents from the cylinder via valve means such as a 3-way ball valve (21) or other suitable valve means. Removal of pasteurized liquid and water supply can be via suitable hoses or tubing (49A).

Other options for controlling the required cycles include the following:

A) Infrared heat detection, or other commercially available means for detecting temperatures in the pasteurized fluid and/or the heating system.

B) A series of temperature controlled timers could also be utilized to control the process required.

C) Remote control systems and wireless options can also be provided for this product, although they may be economically unwarranted at this time.

Process Description:

Generally, the process for pasteurizing the desired fluid is as follows: The operator fills the inner cylinder (1) with fluid to be treated (41). The lid (40) is replaced on the cylinder (1) and the controller (24) power is turned on at switch (23). With the power on, heating and cooling cycles can be initiated separately, as discussed below. Cold water (10B) is normally supplied via inlet (10) and check valve (10C) to the outer cylinder (2) at all times, but hot water can optionally be provided during the heating cycle, as described above. As an alternative to manual check valve (10C), a solenoid valve or electromechanical float valve can be used. Suitable connections, valving and controls can be provided to supply hot water to start the cycle, then cold water to flush the heated water from the annulus and cool the inner cylinder. The cycle is normally initiated at the controller by depressing the START button (42) on the control panel (24B) shown in FIG. 8. Control panel (24B) is covered by a sheet (24A) of transparent, pliable, water-resistant plastic material to protect it from moisture. The various control buttons are pressed through this cover sheet, except for power switch (23), which protrudes through a cutout portion. Status lights 54 are provided to indicate when the system is in heating or cooling mode. The user is then presented on display panel (60) with the choice to start immediately or to delay the start to a programmable time later in the day.

When the cycle starts, the heating elements (12) provide heat to the water in the annular heat transfer fluid space (2C) between the inner (1) and outer (2) cylinders. This water heats to a controlled preset temperature and in turn transfers heat into the fluid to be pasteurized through the outer walls and (preferably) bottom (1A) of the inner cylinder (1). The pump (3) is automatically actuated (as described above) to draw fluid to be pasteurized from the inlet (4) and return it to the outlet (5) to mix the fluid and provide even heating. The thermocouple M (8) monitors the temperature of the fluid within the inner cylinder (1). The other thermocouple W (9) monitors the temperature of the heat transfer fluid (43) within the heater. If the pressure within the heater exceeds safe levels, it is relieved through the pressure relief valve (7).

Once the desired programmable temperature set via a series of steps employing all the buttons of the fluid to be pasteurized is reached, it is maintained at this level by the controller within the designed tolerance while the programmable timer (58) counts down the required length of time required to achieve pasteurization. The preset time and remaining cycle time are shown on display panel (60). After the heating and timing phases of the cycle are complete, the cooling cycle begins. The heat is turned off and solenoid valve (18) is opened. This allows cold water to flow through the annular space between the inner and outer cylinders. The hot water is displaced through outlet (11), tubing (22) and hose (22A), and the fluid inside the inner cylinder is subsequently cooled by the cold water.

Once the preprogrammed cool temperature is reached, the system shuts down and alerts the operator via audio or other suitable signal that the cycle is complete. The fluid can then be drained from the inner cylinder by opening valve (21) and activating the pump (3) via the "PUMP ONLY" switch (48) to pump the fluid to the desired location. Status lights (56) for each switch are provided to indicate when these functions are proceeding. The process can be actuated and followed via control panel (24B), shown in detail in FIG. 8. The panel is enclosed within NEMA enclosure (38), and covered by a flexible, water-resistant, transparent covering (24A), except for protruding power switch (23). Display screen (60) is also covered by covering (24A). Power can be turned on (or off) by switch (23), when display (60) will indicate "IDLE". START button (42) can be pressed to initiate a complete cycle, or to enter the delayed start function. At this point display (60) will indicate the set temperature (for treated fluid), the stage of the cycle and the time remaining for cycle completion. Signal lights 54 indicate whether the system is heating or cooling. Other signal lights 56 are provided for each functional button to indicate when that function has been actuated. Although all these signal lights are presently red, they can be color coded to better identify the functions and progress of the cycle. These lights can be any suitable type, but are preferably light-emitting diodes (LEDs).

The HEAT ONLY button (44) can be pressed to actuate only the heating phase of the pasteurization process. In this case, the heated fluid will not be cooled at the end of the heating cycle. Display (60) will indicate the temperature and signal "END" when heating is complete. The "COOL ONLY" button (50) can be pressed when the milk or other liquid has already been pasteurized completely, but is not yet cool enough to handle or feed. Display (60) will indicate the temperature and signal "END" when the cooling process is complete. The "UP" (46) and "DOWN" (52) buttons are used during programming or alterations to the time and temperature settings. The "PUMP ONLY" button (48) is pressed to actuate pump (3) to drain the unit of treated fluid, after valve (21) is opened This button also permits the pump to be operated at any time the display shows the "IDLE" or "END" modes.

Audio alarm (47) is actuated by controller (24) to sound at the end of a completed cycle, with display (60) indicating "END". If a cycle is initiated but not completed properly within the preset time, alarm (47) will also sound and an error signal will appear on display (60).

The system is then cleaned by conventional sanitary methods and prepared for another cycle.

As suggested above, such control systems can be assembled and set up for operation on a manual basis, but are preferably capable of fully automatic operation and are programmed to execute the complete cycle as outlined above with a simple actuation by the operator. The objective is to permit the pasteurization or other heat treatment to proceed with a minimum of attention from the operator. Control panel 24B provides visual signals (using LED light-emitting diodes or the like) while the system is operating, identifying the heating and cooling stages, and preferably includes audible signals as well. The operator may be busy with other tasks, but will want to utilize the product promptly when the cycle is complete, and perhaps initiate another cycle with a fresh batch of product.

Heating of the heat transfer fluid can be accomplished by many suitable heating means, including:
A) Extruded aluminum plating with electrical elements embedded within to provide a solid heat source.
B) Coils that are heated from an external source such as hot water or steam that provide the surface area contact to the walls of the inner cylinder.
C) Steam injected into the area between the inner and outer cylinders.
D) Gas heat, with direct heating of the inner cylinder or tubes within the annular space between the inner and outer cylinders.

Cooling of the inner cylinder and its contents can also be accomplished by:
A) Refrigerated coolant supplied to circulate around the inner cylinder to provide cooling either directly or indirectly to the pasteurized fluid; or
B) Ice cooling of the fluid, directly or indirectly.

Figure 9A:
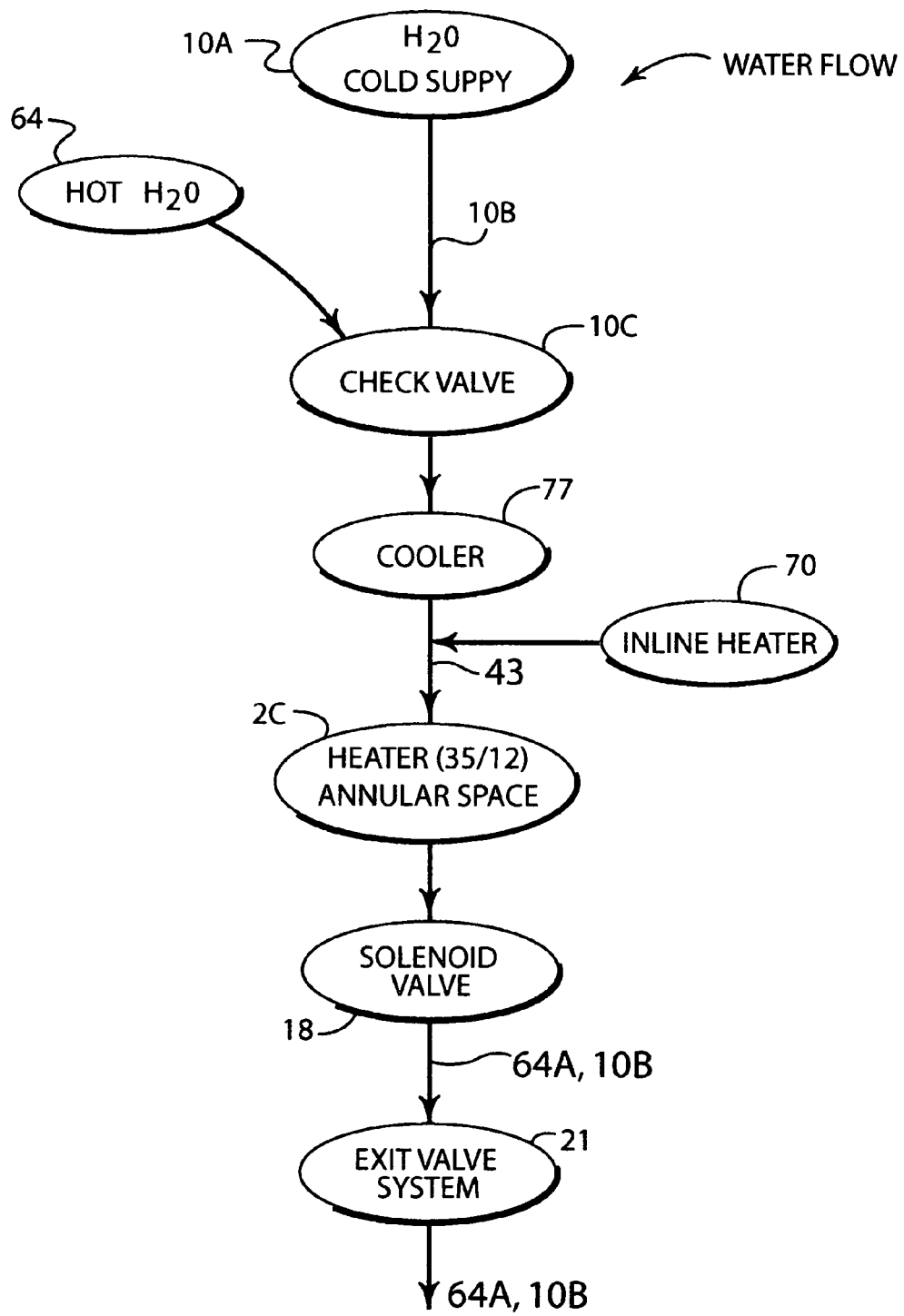
FIG. 9A is a schematic diagram of water flow.

FIG. 9 is a schematic diagram of a control system for the operation of the apparatus and method of an embodiment of the invention. The controller (24) monitors and displays on display panel (60) the temperature of the circulating liquid and turns the various devices of the pasteurizer on and off as required. As shown in FIGS. 9 and 9A, control system (B) comprises a controller (24) which communicates with display panel (60), thermocouple probes M (8) and W (9), pump (3), main power switch (23), 24-hour clock (59), heater contactor (35) and elements (12), timer (58) and relay (32) for solenoid outlet valve (18). In operating the system, and connecting water hose(s) and power, main switch 23 is turned on and optional water solenoid inlet valve (10) (not shown here) can be opened via relay (68) to allow entry of water to annular chamber 2C, preferably hot, from source 64. (See FIG. 9A, a schematic diagram of water flow.) In the simpler version physically illustrated earlier, water inlet check valve (10C) can be opened manually to admit cold water from source (10A) and normally left open during operations. Inline heater (70) is normally turned on (if available) to help heat the hot water to the proper pasteurizing or sterilizing temperature. Pump (3) is started via relays 33 and 34 to circulate the fluid to be pasteurized within cylinder (1).

Once annular chamber (2C) is filled with heating water (preferably hot), heating elements (12) and heater contactor (35) are energized, also via relays (33) and (34). The water is heated to the set temperature, and subsequently maintained at that temperature by temperature inputs from thermocouple W (9) and on-off control of the heating elements (12). Once the liquid being pasteurized (41) reaches treatment temperature, the control system operates to maintain it at that temperature, via on-off control of the heating elements (12) and using temperature inputs from thermocouple M (8), for a preset time governed by timer (58). Upon completion of the required time, the controller cuts power to heating elements (12) and actuates solenoid valve (18) via relay (32) to release the heated liquid (64A) from annular chamber (2C). The heated water is flushed from chamber (2C) by the flow of cold water (10B) from source (10A), optionally chilled by cooler (77). Once the pasteurized liquid has reached the set cooled temperature for immediate use or storage, the flow of cooling liquid is stopped by the closing of solenoid valve (18), actuated by relay (32). Then three-way valve (21) can be opened and pump (3) engaged by relay (33) to pump out the pasteurized liquid via tubing 22 and hose (22A).

Digital display (60) displays the temperature(s) measured by thermocouple M (8) in the circulating treated liquid (41) and by thermocouple W (9) of heating/cooling fluid (43). Signal lights (54) light up for the heating or cooling cycles, as discussed above. At least two buttons (46) and (52) are provided for programming heating and cooling temperatures and other functions used in setting up the apparatus for standard cycles.

Signal lights (56) are red, and light up to signal the heating, cooling and pumping stages of the programmed heating/cooling cycle. Preferably, these light signals also actuate an audible signal (not shown here) to alert the operator to the progress of the cycle.

Figure 10:
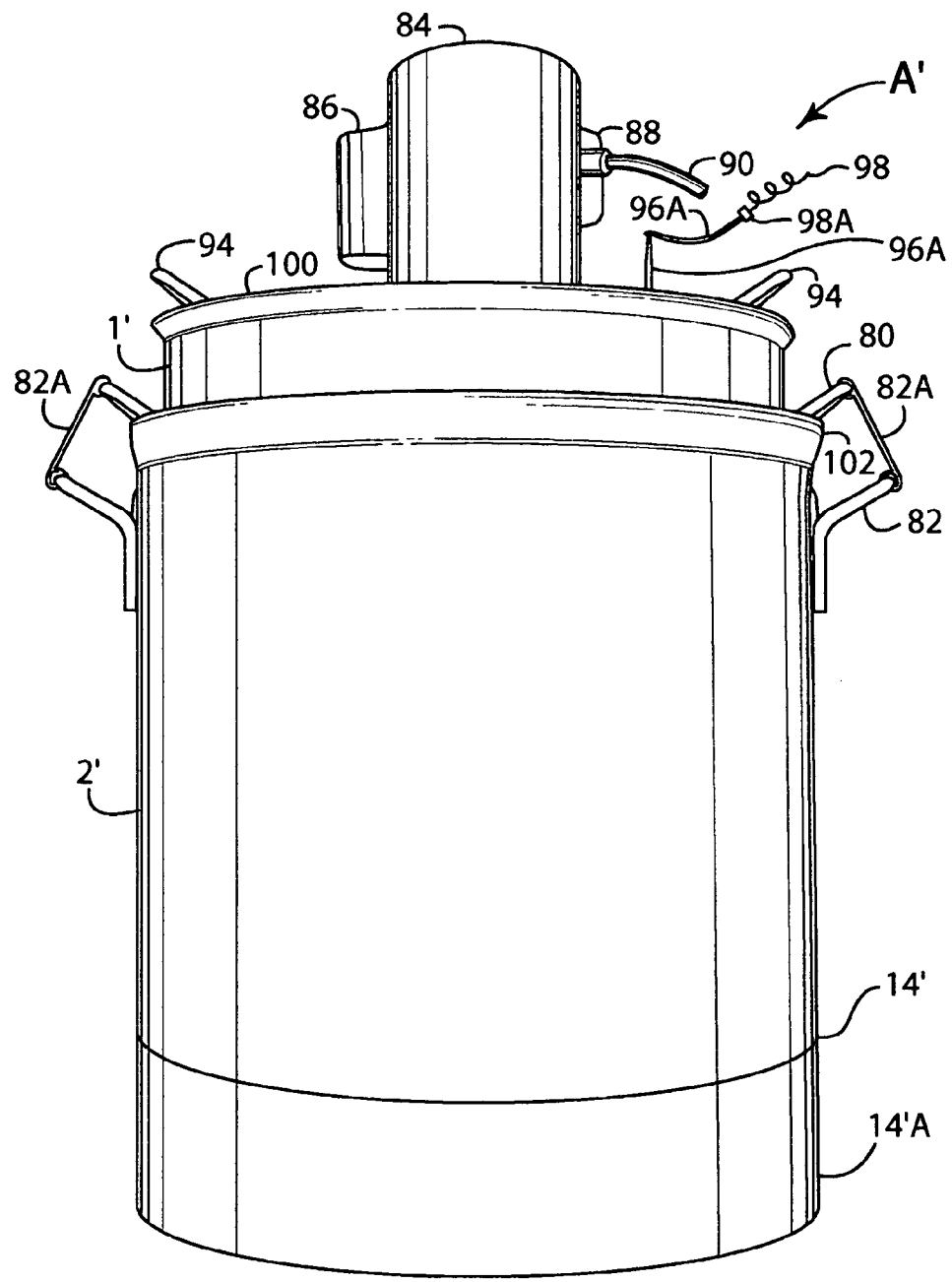
FIG. 10 is a perspective side view of a simplified embodiment of the apparatus.
Figure 11:
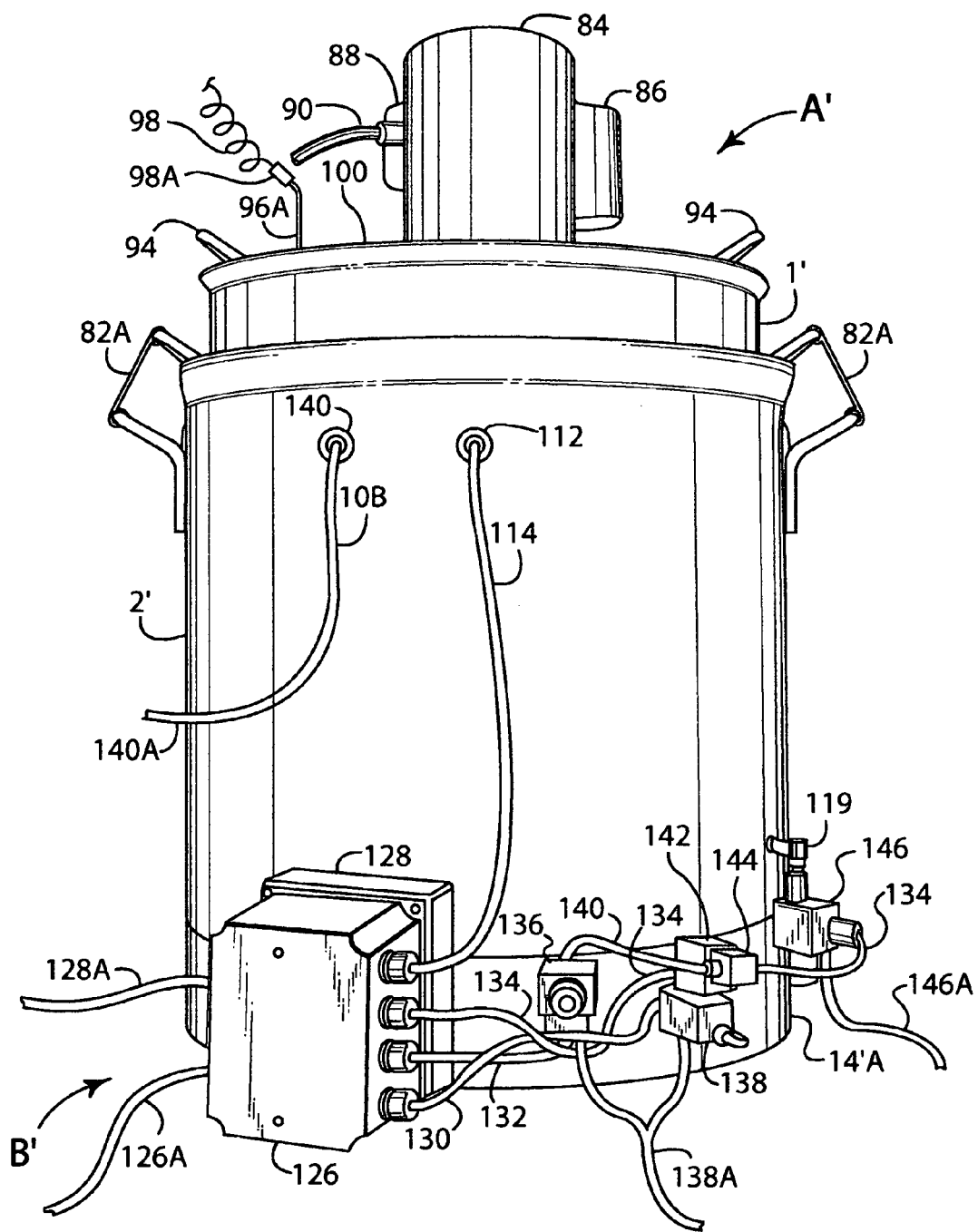
FIG. 11 is a perspective view of the other side of the apparatus of FIG. 10.
Figure 12:
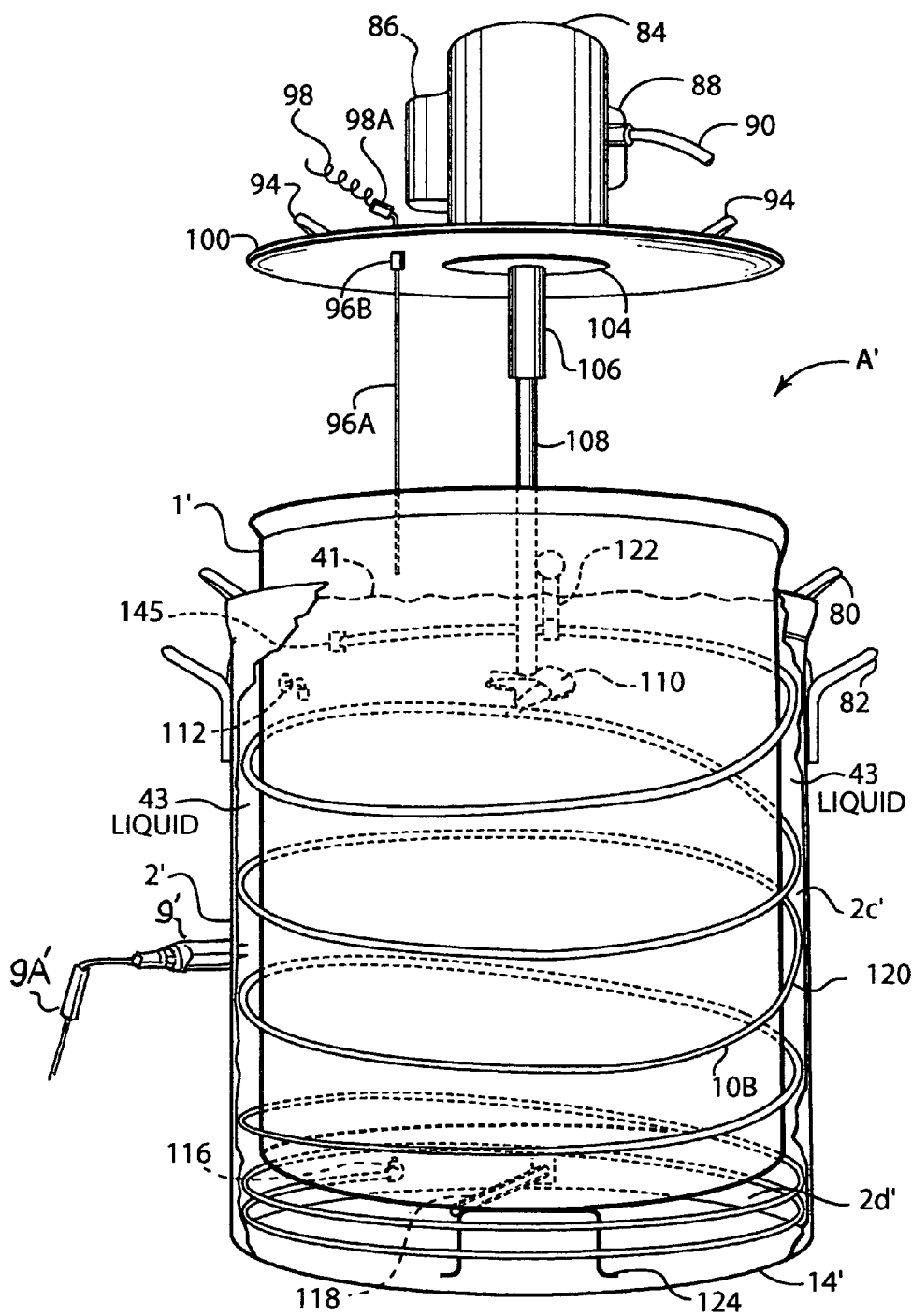
FIG. 12 is an exploded/cutaway view of the apparatus of FIG. 10.

A simpler embodiment of the invention is illustrated in FIGS. 10 through 12. The following description emphasizes essential features of components, control and operation, since this embodiment employs many components and techniques which are similar or identical to those described above for other embodiments. The simplified pasteurizer A' comprises an outer drum 2' with handles 82 and an optional flange or thickened area 102 on the top surface thereof. A base 14'A can optionally be provided to elevate bottom 14' of drum 2' about a foot from the floor. Inner drum 1' with handles 80 is adapted to fit into outer drum 2' and is held in place by mechanical supports comprising handles 80 and/or lower supports 124 that are affixed to the bottom 14' of outer drum 2'. These supports serve the functions of assisting in suspending the weight of the inner drum 1' as well as to protect heating element(s) 118 from damage. Inner drum 1' fits within outer drum 2' so as to create an annular space 2c' between the walls of the two drums. The handles of the two drums 80 and 82 can be attached to each other by means of a latch, strap or other system 82A which secures the two drums together and prevents buoyancy from floating the inner drum 1' if it is not full enough to stay within the confines of the annular space. The drums fit together to provide either an airtight seal with appropriate seals (not shown here), or a system open to the atmosphere as shown. Inner drum 1' is positioned above the bottom of outer drum 2' so as to allow a space 2d' between the bottoms of the two drums. Heating/cooling liquids can then circulate freely, for optimal heat transfer, in spaces 2d' and 2c'.

The two drums can be made of stainless steel, food grade aluminum or other suitable materials discussed above. A lid 100 houses motor 84 and is used to close the top of inner drum 1' once it is filled with milk or other liquid (41) to be processed. This drum 1' can be filled by any suitable means, including pouring from buckets or other containers, pumping or siphoning through hoses, and the like. Connections for filling and emptying drum 1' through lid 100 can be provided, as described above for other embodiments.

Motor 84 is an electric motor mounted atop lid 100, with standard face-mounting bolts or other mechanical connectors 105, (not shown here). These bolts or fasteners are then covered with a plastic water shield 104 to protect the face of the motor from contact with the pasteurized product and to prevent build up of product on the face of the motor. The motor 84 shaft (not visible here) is connected via coupler 106 to a secondary shaft 108 that in turn is attached to an impeller 110 protruding below. Water shield 104 slides onto the motor shaft before coupler 106 and rotates with the shaft, thus preventing milk from reaching the motor shaft. When the motor 84 is running, it turns impeller 110, which circulates the treated liquid 41 within drum 1' as described in Applicant's previous U.S. Pat. No. 6,276,264, thereby providing even heat transfer to the pasteurized product 41. Power is delivered to the motor 84 via an electric cord 90 attached at the electric wire housing 88 on the motor frame. Motor capacitor 86 is visible in all figures. Thermocouple 96A also protrudes through the lid 100 via a compression fitting 96B. Via connector 98A, thermocouple 96A can then communicate through a thermocouple cord 98 to controller 24 of the control system. The lid 100 also has two handles 94 for placing or removing the lid from the inner drum 1'. The lid with motor attached can be stored on standard wall brackets during filling or emptying of the pasteurizer.

Heating/cooling fluid coil 120 enters the bottom of outer drum 2' and space 2d' between the drum bottoms at point 116, which is a bulkhead compression fitting, ascends up the inside of the wall of outer drum 2' in a helical form to the top of the drum via annular space 2c', exiting at point 145 through another compression fitting near the top of drum 2'. Heating/cooling fluid 10B can be circulated through coil 120 to effect heat transfer. The exiting fluid can be routed via drain hose 140A to a drain as it exits fitting 140 or recycled for reuse, e.g. when the fluid is chilled by refrigeration. Coil 120 can be formed of any suitable heat conductive material which can be formed into a permanent helical coil and is compatible with the treated fluid, including stainless steel, other ferrous or nonferrous alloys, tinned copper, brass, etc. The coil is formed into a permanent helical shape and/or mechanically retained in place, e.g. by coil support(s) 122, so as to permit the easy insertion and removal of inner drum 1' without interference. Coil supports 122 can be mounted wherever necessary to hold the coil 120 as well as to protect it from damage as the inner drum 1' is being inserted or removed from the outer drum 2'. Supports 122 also serve as a guide for the easy placement of the inner drum 1' as it is inserted. Heating/cooling fluids 10B can be used within the coil to accelerate the heating of the treated fluid, e.g. by flowing hot water or steam, and can be used to cool the fluid after treatment. Cold tap water can be used, or the fluid can be chilled by refrigeration to provide for faster cooling, as described above for other embodiments.

At least one waterproof electric heating element 118 is provided in space 2d' near the bottom of outer drum 2' so as to rest under inner drum 1' and heat the heating fluid contained in space 2d' and annular space 2c' as part of the programmed cycle, as described above for other embodiments of the invention. Element(s) 118 can be similar to those described above for other embodiments. Element 118 is preferably positioned to avoid contact with the bottom of inner drum 1', and mechanical support(s) 124 can be used to position inner drum 1' firmly to prevent such contact. A heating/cooling liquid 43, normally water, can be poured into outer drum 2' before inner drum 1' is inserted, or pumped into annular space 2c' through actuation of a solenoid valve 136 or other suitable means. The water level is controlled by means of an electronic liquid level sensor switch 112 which prevents an excessive amount of water from entering the annular space. Level switch 112 communicates with the water supply valve 136 via electric cord 114. Once inner drum 1' is in place and filled with the liquid to be treated, heating element 118 heats the liquid in annular space 2c' and space 2d' to bring the treated liquid to treatment temperature, under control as discussed below. Temperature sensor 9' monitors the temperature of the heating liquid 43 and communicates with controller 24 via cable 9A'.

When the product reaches the required temperature, it is held there for an appropriate amount of time to achieve pasteurization via the control system. To prevent excessive amounts of heat from being transferred from the annular space 2c' into the treatment product, the control system instructs lower drain valve 146 to actuate. Drain valve 146 allows hot water to be drained out of the annular space via a drain port 119 and a drain tube 146A. As the level of liquid in the annular space goes down, the level switch 112 also allows the infusion of more cold water via supply valve 136. This allows the temperature in the annular space to be reduced to prevent excessive heating. The control system is designed to reach a set temperature for the annular space and be maintained there for a predetermined period of time defined as the "time-out" phase. If the temperature of the treated product falls below required limits during the time-out phase, the draining will cease and the electric element(s) 118 will once again be employed to increase the temperature within the annular space. The system can be fitted with sensors and controls to reduce the treatment temperature differentials to any reasonable tolerance. This cycling of temperature under "on-off" control allows strict temperature control of the treated product, which is vitally important for colostrum pasteurization. (This key feature is an advantage over other systems which lack such tight control).

When the product is pasteurized fully, the cooling step begins. Heater 118 is turned off and cold water valve 138 is actuated via electric cord 130 and control means to allow a cooling fluid 10B (again, normally water) to flow through supply line 138A into cooling coil 120 to reduce the temperature of the fluid within annular space 2c' and space 2d', and eventually that of the treated fluid, to the target lower temperature for use or storage. The treated fluid 41 can then be removed from inner drum 1' by any suitable means, including removal of inner drum 1' and pouring, by pumping or siphoning via hoses (not shown here), or via an installed drain.

Control system B' operates much like that described above for earlier embodiments, except for the difference in the ability to control the temperature of the treated product by means of drain valve 146. The electric element 118 housing consists of a base 128 that is attached to the outer drum 2' by means of brackets or the like, and provides an attachment point for the water-resistant housing box 126. There is also a series of terminal blocks to allow for appropriate wiring connections to be made from the electric supply cords 126A and 128A to the various valves 136, 138, 146 and liquid level switch 112. The electric wires then supply the valves in the following manner: cord 130 provides 110 VAC to cold water valve 138 (142 is the solenoid on the valve 138 and 144 is the DIN plug for solenoid 142); cord 132 supplies 110 VAC to supply valve 136; cord 134 supplies 110 VAC to drain valve 146. All of these valves are preferably mounted in a base (14'a) that the entire unit sits upon rather than being mounted to the outer surface of the unit as was previously done. Base 128 supports cover 126 and contains control mechanisms similar to those described above.

In summary, the system operates by filling inner drum 1' (which is immersed in a heating/cooling fluid 41 within outer drum 2') with a liquid 41 to be treated, e.g. milk. Heating element 118 is activated to heat fluid 43 to a temperature effective to bring the treated fluid to a treatment temperature, e.g. pasteurization temperature. If it is desired to accelerate the heating of the fluid under treatment, hot fluid can be pumped into outer drum 2' and annular space 2c' via suitable connections in lid 100 or the side of drum 2' (not shown here, but described above for other embodiments), while being drained from the bottom of drum 2' via drain valve 146A. When the treated fluid is at or near the treatment temperature, heating element 118 can be switched off, and can be switched back on or off to maintain the temperature of the treated fluid at the selected treatment temperature (within a preset tolerance) for the designated time. Draining and refilling of heating fluid also plays a part in temperature control of the treated liquid 41. (Selected combinations of pasteurization temperature/time profiles are given above.) When the treated fluid 41 has completed the selected temperature/time treatment profile, heater 118 is switched off for the cycle, and cooling fluid 10B is circulated through coil 120. As with the heating cycle, a cooling fluid 43 can also be pumped through annular space 2c' to flush the heating fluid and accelerate the cooling of the treated fluid to the appropriate lowered temperature.

When the treated fluid 41 has reached proper temperature for use or storage, it can be removed from inner drum 1' as described above, or alternatively lid 100 can be lifted to permit the removal of the entire inner drum 1' with its contents for storage or transport elsewhere. All the components can be cleaned after use by conventional means, as described above and in Applicant's previous patent.

EXAMPLES

The operation and value of the apparatus and methods of the invention will be further illustrated by the following non-limiting examples. Studies done with a Commercial Dairy Tech Model LP 27 based upon Applicant's U.S. Pat. No. 6,276,264 have shown that colostrum can be properly pasteurized. Dairy Tech, Inc. (Applicant's Assignee) provided equipment to be used on a large dairy farm in Colorado. In concert with the University of Minnesota, this independent study was designed to measure the levels of IgG in the colostrum before and after it was pasteurized, typically at 63 deg. C (145.4 deg F.) for about 30 minutes. The serum IgG levels were then measured in the calves that received the product to make certain that absorption occurred as well. From this study Applicant learned that the product was adequately pasteurized to remove harmful pathogens, and that the calves received enough IgG from the pasteurized product to confer proper immune status. Results of this study were published in the Journal of Dairy Science Association, 2003, J. Dairy Sci. 86: 1503-1512, incorporated herein by reference.

Other information was gleaned from this research to assist the operator in determining optimum volumes to process, smaller batches being preferable, as well as how to deal with foaming of the product during the procedure. By designing this piece of equipment to be able to work at any combination of time and temperatures, the dairy industry can be offered the ability to pasteurize more than one product with the same machine. Applicant is also afforded the ability to adjust the demands on the system as new research reveals even more.

The research reported in the cited paper indicated that larger batches of milk (e.g., 95 L or about 25 gallons) resulted in excessive reduction of immunoglobulins, as well as a product with a thickened consistency. To avoid such results, it is important to provide equipment which can handle small batches of milk or colostrum. Initial trials have indicated that this requirement can be met with both embodiments disclosed above, which will handle almost any reasonable volume of liquid to be pasteurized. To date, these studies indicate that limiting the volume of processed liquid to 57 L (about 15 gallons), results in a more consistent pasteurized product (milk and/or colostrum) with higher levels of IgG. Part of the effects seen in larger volumes of product can be explained by the temperature/time profiles required by the process. With 40 to 50 gallon batches, the process often takes about 100 to 120 minutes to complete (depending upon starting and pasteurization temperatures). The time required to pasteurize smaller volumes (say 15 gallons) is closer to 60 to 70 minutes. Maintaining tight temperature tolerances during the process is also clearly important. As discussed in the cited article re bovine colostrum, managing both batch size and maximum temperature will be critical to yield a product which retains enough immunoglobulins to provide the newborn calves with adequate immune function. Specific time/temperatures used in the study were 63 deg. C (145 deg. F) for 30 minutes. This suggests that ranges of time and temperature ranging from about 130 to about 150 deg. F and from about 60 to about 20 minutes would be useful to produce such pasteurized colostrum products.

An example of this is seen with the dairy goat industry. The colostrum from these goats is pasteurized to eliminate a specific pathogen (CAE, or Caprine Arthritis and Encephalitis Virus), but to preserve the integrity of the colostrum, the process is carried out at a lower temperature for an even longer period of time. For example, the colostrum may be heated to 57 deg. C (135 deg. F) and held at this temperature for about 50 minutes. Typically this is accomplished with water-bath type systems, but the presently disclosed embodiments of the inventive apparatus are believed capable of meeting the specific time/temperature profiles and the narrow temperature tolerances required. For milk, colostrum and similar products, optimum temperature-time profiles can be determined by starting within the ranges disclosed above and in the trade literature. Post-pasteurization analyses of intact IgG and target pathogenic organisms then will permit the maximization of intact IgG for a given batch size while destroying all target organisms. The versatility and tight process control of the improved system of this invention is part of what will make it unique among currently marketed products.

Clearly, numerous modifications and variations of the present invention are possible in light of the above teachings. It is therefore to be understood that within the scope of the appended claims the invention may be practiced otherwise than as specifically described herein.

I claim:

1. A batch pasteurizer for liquid dairy products, comprising:
   a first cylindrical container for containing the liquid to be heated and cooled;
   a second cylindrical container surrounding the circumference and height of said first container to form an annular chamber therebetween, with the bottom of said second container displaced vertically below the bottom of said first container to permit fluid circulation therebetween, so that the bottom of said first container and substantially the entire wall portion of said first container serve as heat transfer surfaces;
   means for filling said annular chamber with heating or cooling fluid;
   means for draining said fluid from said annular chamber;
   at least one electrical heating element between the bottoms of said first and said second container to heat the heating liquid between said bottoms;
   circulation means comprising an impeller with drive means mounted atop a lid fitted to said first container, and positioned to agitate the treated fluid when rotated by said driving means;
   a helical coil of thermally-conductive tubing extending from the top of said second container to the bottom thereof and connected to a source of cooling fluid so as to circulate same and cool the heating fluid in said annular chamber thereby;
   temperature sensing means for measuring the temperature of the liquid product during the heating and cooling processes;
   temperature sensing means for measuring the temperature of the heating and cooling fluids within said annular chamber;
   switching and valve means for controlling the flow of heating fluids to and from said annular chamber and to said helical coil; and
   control means for executing a cycle of introducing and heating said heating fluid within said annular chamber and said space between said container bottoms for a time effective to bring the liquid product to a pasteurization temperature and hold it at said temperature for a time effective to complete pasteurization, thereafter directing a cooling fluid through said helical coil and shutting off said heating means for said heating fluid for a period of time effective to cool said liquid product to a temperature suitable for storage or immediate use.

2. The apparatus of claim 1 wherein said means for removing said heating fluid from said annular chamber are adapted to be employed to accelerate the cooling of said liquid product.

3. A process of thermal treatment of a fluid within the first container of the apparatus of claim 1, comprising steps of:
   introducing a fluid to be treated into said first container;
   filling the annular space provided between said first and second containers with a heating fluid;
   activating said circulation means to circulate the fluid under treatment within said first container;
   activating said heating means to heat the heating fluid within said annular space for a time effective to heat the treated fluid to the desired temperature and maintain same for the desired time period;
   shutting off said heating means and introducing cooling fluid into said helical coil within said annular space to cool the fluid under treatment within said first container and maintain said fluid under treatment at a desired cooled temperature for a desired time period; and
   removing the treated fluid from said first container.

4. The process of claim 3 wherein said heating fluid is drained from said annular space after the heating cycle is complete to accelerate the cooling of the treated liquid.

* * * * *